United States Patent
Plache et al.

(10) Patent No.: US 10,281,894 B2
(45) Date of Patent: *May 7, 2019

(54) BINDING GRAPHIC ELEMENTS TO CONTROLLER DATA

(71) Applicant: Rockwell Automation Technologies, Inc., Mayfield Heights, OH (US)

(72) Inventors: Kenneth Scott Plache, Scottsdale, AZ (US); Steven John Kowal, Milwaukee, WI (US); Michael D. Kalan, Highland Heights, OH (US); Joseph Bronikowski, New Berlin, WI (US); Douglas J. Reichard, Fairview Park, OH (US); Christopher E. Stanek, Willoughby, OH (US); Reginald W. Sprecher, Waukesha, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 80 days.

This patent is subject to a terminal disclaimer.

(21) Appl. No.: 15/666,254

(22) Filed: Aug. 1, 2017

(65) Prior Publication Data

US 2017/0329299 A1    Nov. 16, 2017

Related U.S. Application Data

(63) Continuation of application No. 14/325,321, filed on Jul. 7, 2014, now Pat. No. 9,753,446, which is a
(Continued)

(51) Int. Cl.
*G06F 19/00*    (2018.01)
*G05B 19/042*   (2006.01)
*G06F 3/0484*   (2013.01)

(52) U.S. Cl.
CPC ..... *G05B 19/0426* (2013.01); *G06F 3/04842* (2013.01); *G05B 2219/23258* (2013.01)

(58) Field of Classification Search
CPC ...... G05B 19/0426; G05B 2219/23258; G06F 3/04842
See application file for complete search history.

(56) References Cited

U.S. PATENT DOCUMENTS 6,446,076 B1    9/2002    Burkey et al.
6,754,885 B1*   6/2004    Dardinski .............. G05B 15/02
                                                              717/113
(Continued)

FOREIGN PATENT DOCUMENTS

CN    1737790    2/2006
CN    1950767    4/2007
(Continued)

OTHER PUBLICATIONS

Office Action for U.S. Appl. No. 13/171,114, dated Oct. 28, 2013, 10 pages.
(Continued)

*Primary Examiner* — Michael D Masinick
(74) *Attorney, Agent, or Firm* — Amin, Turocy & Watson, LLP

(57) ABSTRACT

Graphic element definitions are bound to industrial automation data types in an industrial control system. Moreover, a system provides automatic data searching and filtering of an item based on user interactions with either the graphic element definition or a controller data type. Further, a graphic element definition is associated with a data source type information, to simplify configuration of an instance of that graphic element and populate suitable data source fields based on instances of the associated data source type. In addition, a system to automatically generate the graphic element based on data from a logic controller is provided.
(Continued)

Moreover, the graphic element can be updated to reflect a change in the data, without a manual refresh.

20 Claims, 14 Drawing Sheets

Related U.S. Application Data continuation of application No. 13/171,114, filed on Jun. 28, 2011, now Pat. No. 8,798,775.

(56) References Cited

U.S. PATENT DOCUMENTS

| | | | |
|---|---|---|---|
| 6,791,581 B2 | 9/2004 | Novak et al. | |
| 7,089,530 B1 * | 8/2006 | Dardinski | G05B 15/02 700/83 |
| 7,096,465 B1 * | 8/2006 | Dardinski | G05B 19/0426 717/121 |
| 7,721,273 B1 | 5/2010 | Hall et al. | |
| 7,835,805 B2 | 11/2010 | Hood et al. | |
| 7,856,279 B2 | 12/2010 | Hood et al. | |
| 7,912,560 B2 | 3/2011 | Hood et al. | |
| 8,368,640 B2 | 2/2013 | Dardinski et al. | |
| 2002/0103817 A1 | 8/2002 | Novak et al. | |
| 2003/0184585 A1 | 10/2003 | Lin et al. | |
| 2004/0201603 A1 | 10/2004 | Kalish | |
| 2004/0210825 A1 | 10/2004 | Novak et al. | |
| 2005/0044504 A1 | 2/2005 | Fernandez et al. | |
| 2006/0026193 A1 | 2/2006 | Hood | |
| 2006/0288301 A1 | 12/2006 | Hood et al. | |
| 2007/0079355 A1 | 4/2007 | Chand et al. | |
| 2007/0109580 A1 | 5/2007 | Yoshida | |
| 2007/0132779 A1 * | 6/2007 | Gilbert | G06F 9/4488 345/619 |
| 2008/0092057 A1 | 4/2008 | Monson et al. | |
| 2008/0147207 A1 | 6/2008 | D'Mura et al. | |
| 2008/0188956 A1 | 8/2008 | Hood et al. | |
| 2009/0217200 A1 | 8/2009 | Hammack et al. | |
| 2009/0248741 A1 * | 10/2009 | Singh | G06F 9/4484 |
| 2010/0077350 A1 | 3/2010 | Lim et al. | |
| 2010/0082123 A1 | 4/2010 | Plache et al. | |
| 2012/0194502 A1 * | 8/2012 | Smith | G06F 8/38 345/418 |
| 2013/0006395 A1 | 1/2013 | Plache et al. | |

FOREIGN PATENT DOCUMENTS

| | | |
|---|---|---|
| CN | 102037682 | 4/2011 |
| CN | 102073448 | 5/2011 |
| CN | 102089786 | 6/2011 |
| EP | 0107263 | 5/1984 |
| EP | 0691604 | 1/1996 |
| EP | 2 482 207 A2 | 8/2012 |

OTHER PUBLICATIONS

National Instruments Corporation, "LabView: User Manual," Jul. 2000 Edition, Part No. 320999C001, 272 pages.
European Search Report for European Patent Application No. EP11179086 dated Jul. 30, 2013, 9 pages.
Notice of Allowance for U.S. Appl. No. 13/171,114, dated Mar. 21, 2014, 12 pages.
Chinese Office Action dated Sep. 3, 2014 for Chinese Application Serial No. 201210224455.2, 11 pages.
Office Action dated Oct. 5, 2012 for U.S. Appl. No. 12/869,524, 18 pages.
Office Action dated Apr. 3, 2013 for U.S. Appl. No. 12/869,524, 20 pages.
Office Action dated Aug. 14, 2014 for U.S. Appl. No. 12/869,524, 21 pages.
Butler, et al. "Device independence and the Web" IEEE Internet Computing, Sep. 1, 2002, IEEE Service Center, New York, NY.—Institute of Electrical and Electronics Engineers, US—ISSN 1089-7801, 6 pages.
European Office Action dated Dec. 2, 2014 for European Application Serial No. 11179086.1, 7 pages.
Final Office Action for U.S. Appl. No. 12/869,524, dated Mar. 13, 2015, 26 pages.
Notice of Allowance for U.S. Appl. No. 12/869,524, dated Jul. 7, 2015, 11 pages.
Chinese Office Action and English Translation for CN Patent Application Serial No. 201210224455.2, dated May 6, 2015, 11 pages.
Chinese Office Action for CN Patent Application Serial No. 201210224455.2, dated Feb. 6, 2016, 3 pages.
Office Action for U.S. Appl. No. 14/325,321, dated Dec. 21, 2016, 37 Pages.
Notice of Allowance for U.S. Appl. No. 14/325,321, dated May 4, 2017, 12 pages.
Notification to Grant Patent Right for Invention and English Translation for CN Patent Application Serial No. 201210224455.2, dated Jun. 8, 2016, 4 pages.
Extended European Search Report issued in European Patent application No. 12174069.0, dated Sep. 1, 2017, 10 pages.
Non-Final Office Action received for U.S. Appl. No. 14/879,067, dated Apr. 5, 2018, 24 pages.
Office Action for Chinese Patent Application Serial No. 201610709667.8 dated May 30, 2018, 6 pages.

* cited by examiner

502

| Property | Value |
|---|---|
| dataValue | {::Controller_1\PressureSensor_101} |

FIG. 5A

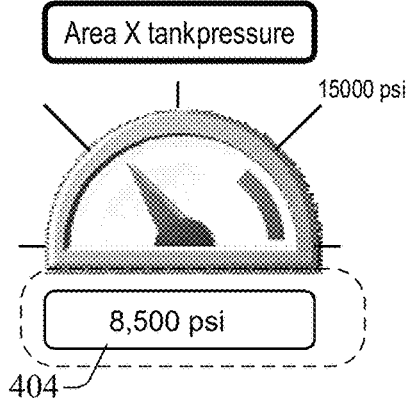

406

| Property | Value |
|---|---|
| Text | {::Controller_1\PressureSensor_101 + ' ' + ::Controller_1\PressureSensor_101.@Units} |
| Fill Color | {colorConverter(::Controller_1\PressureSensor_101)} |
| Border Thickness | 1 |
| Border Color | Black |

FIG. 5B

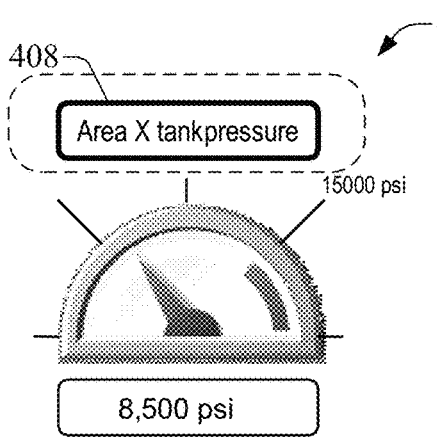

410

| Property | Value |
|---|---|
| Text | {::Controller_1\PressureSensor_101.@Description} |
| Fill Color | White |
| Border Thickness | 3 |
| Border Color | Black |

FIG. 5C

BINDING GRAPHIC ELEMENTS TO CONTROLLER DATA

CROSS REFERENCE TO RELATED APPLICATIONS

This application is a continuation of, and claims priority to U.S. patent application Ser. No. 14/325,321, filed Jul. 7, 2014 and entitled "BINDING GRAPHIC ELEMENTS TO CONTROLLER DATA," which is a continuation of U.S. patent application Ser. No. 13/171,114, filed Jun. 28, 2011 and entitled "BINDING GRAPHIC ELEMENTS TO CONTROLLER DATA" (now U.S. Pat. No. 8,798,775, issued on Aug. 5, 2014), which is related to co-pending U.S. patent application Ser. No. 12/869,524, filed on Aug. 26, 2010, entitled "AUTOMATED OPERATOR INTERFACE GENERATION IN A CONTROL SYSTEM" (now U.S. Pat. No. 9,182,755, issued on Nov. 10, 2015). The entireties of each of the above noted applications are incorporated herein by reference.

TECHNICAL FIELD

The subject disclosure relates to automation control, and more specifically, to a system and method for binding graphic elements to controller data.

BACKGROUND

Industrial control systems regulate operation of equipment in an industrial environment, where operation of the equipment includes process(es) typically directed to accomplishment of a complex task or a streamlined, automated task, such as large scale manufacturing. Regulation of operation of the equipment and related process(es) typically exploit and produce substantive amounts of control data, which include configuration data such as controller code, human-machine interface (HMI) data, process recipe(s) and report definitions, or the like. In addition, operation of industrial control systems also produces both real-time and historical data about the status of regulated equipment and related process(es), the data including alarms, process values, and audit/error logs. To operate industrial control systems, various HMIs in the industrial environment render control data (real-time (or last known) and historical data) through operator interfaces which convey process overviews or equipment detail. Multiple operator interfaces are created to provide rich information related to the various control processes implemented in the industrial control system so that the operator can switch between them to monitor various aspects of the equipment and related process(es) under control.

Various factors contribute to the time and human resources necessary to configure operator interface(s) employed to render control data in an industrial environment; such factors include complexity of the equipment and related process(es) that are regulated through one or more controllers, amount of control data collected as part of controlling the equipment and the related process(es), and security protocols and associated data necessary to ensure operational integrity of the equipment. Yet, in conventional industrial control systems, development of an operator interface to consume control data through a dedicated human-machine interface (HMI) is a highly manual process that generally occurs after control design or equipment configuration and contributes significantly to the development cost. Specifically, most traditional HMI systems do not support structured data types, and those that do support structured data, provide only one-way interactions.

SUMMARY

The following presents a simplified summary in order to provide a basic understanding of some aspects of the subject disclosure. This summary is not an extensive overview, and it is not intended to identify key/critical elements of the subject disclosure or to delineate any scope. The sole purpose of this summary is to present some concepts in a simplified form as a prelude to the more detailed description that is presented later.

One or more embodiments in the subject disclosure provide a system and method for providing a bi-directional binding between graphic elements and industrial automation data types. For example, a definition of a graphic element can be bound/linked/mapped to a controller data type. Moreover, type mappings, such as, but not limited to, strongly-typed, loosely-typed, and/or un-typed mappings can be utilized to bind a property within the graphic element definition to the controller data type. Typically, the system disclosed herein can provide support for bi-directional workflows with graphic elements and data types, including, but not limited to, structured data types.

Further, another embodiment of the subject specification includes methods and systems for associating/linking/binding a definition of a graphic element with a data source definition, for example, a user defined type (UDT) or an add on instruction (AOI). Moreover, when an instance of the graphic element is created, for example in an HMI configuration environment, the instance can be configured based on population of data source fields by employing instances of the data source type. Typically, a user input can be received to select suitable data sources from a previously configured program file.

Yet another embodiment of the subject disclosure provides a system and method that automatically generates graphic elements based on controller content. Moreover, a new, e.g., previously un-programmed, human machine interface (HMI) can be connected to a logic controller and based on the data on the logic controller, a set of screens can be automatically created in the HMI, with or without (or with minimal) user interaction. In addition, the HMI application can be refined, customized, and/or modified as the controller program is modified (e.g., tag renamed, new control programs, etc.). Moreover, HMI content can be dynamically displayed and modified on a terminal as the controller program is being refined, customized, and/or modified.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIGS. 5A-C illustrate example screenshots that depict configuration of properties of a graphic element in accordance with aspects described herein.

DETAILED DESCRIPTION

Figure 1:
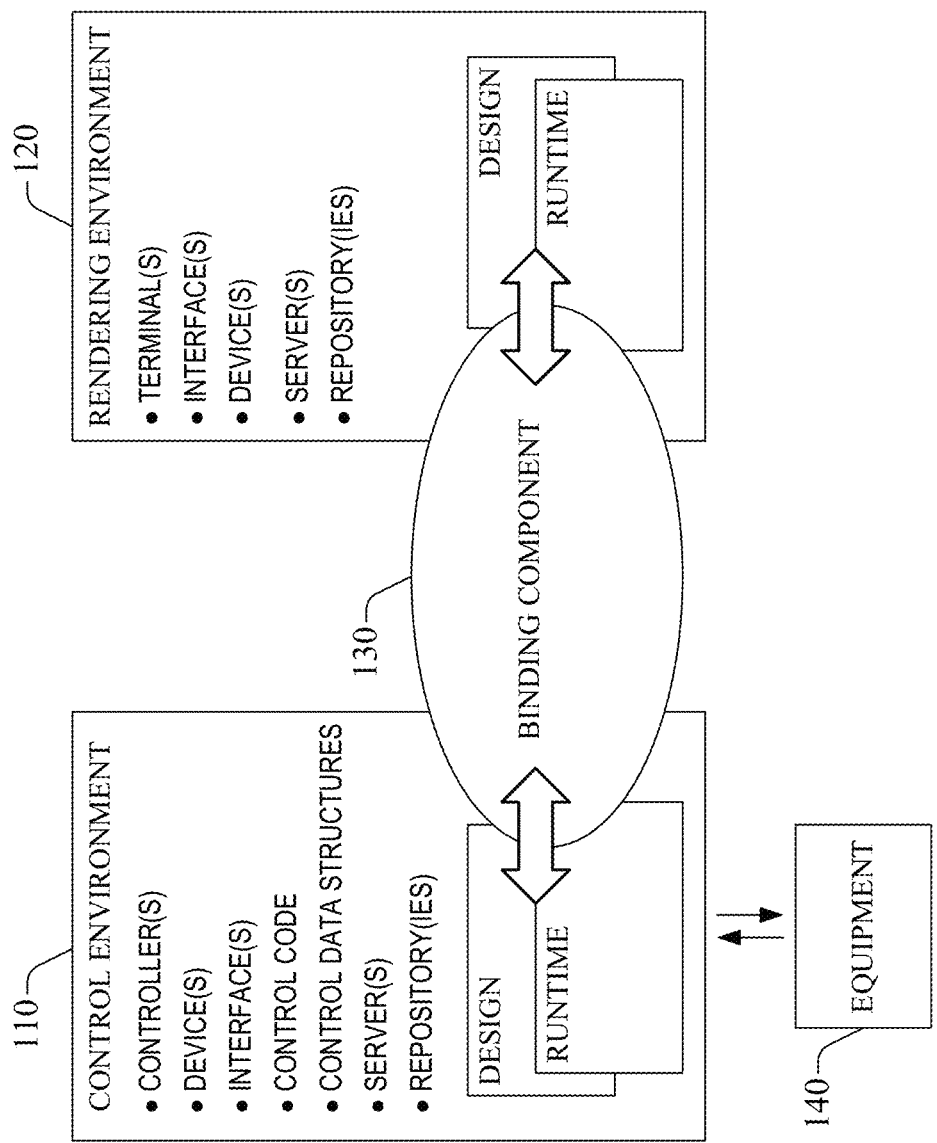
FIG. 1 is a diagram that illustrates a bi-directional mechanism for binding human machine interface (HMI) graphic element definitions to controller data types.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "controller," "terminal," "station," "node," "interface," "editor," are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers.

Components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Typically, the term "data source" used herein can include a generalization of a controller or most any device (e.g., industrial automation device) capable of providing its data type definitions.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a diagram that illustrates a bi-directional mechanism for binding human machine interface (HMI) graphic element definitions to controller data types. In doing so, a user can initiate interactions with either the graphic element definition or the controller data type to facilitate data searching and/or filtering of the corresponding item. The control system includes a control environment 110 and a rendering environment 120 that utilize a binding component 130. Typically, the binding component 130 can be distributed amongst control environment 110 and rendering environment 120; the binding component 130 can include component(s) in design or runtime in control environment 110, and component(s) in design or runtime in rendering environment 120. The control environment 110 is functionally coupled to equipment 140 and associated process(es) (e.g., industrial process(es), manufacturing process(es), measurement process(es) in a laboratory, infrastructure development process(es), such as oil and gas prospecting and extraction, etc.). Equipment 140 generally is specific to a production process and related market space(s) (e.g., beverages, edible goods, textile goods, oil and gas, etc.) and can include one or more sets of tools, a group of machines, numerous systems and related sub-systems, real estate and associated infrastructure, and so forth. Control environment 110 comprises controller(s), device(s), interface(s), machine-executable control code (also referred to as control code), control data structures, server(s), repository(ies), or the like, that control the operation of equipment 140. Further, the rendering environment 120 comprises terminal(s), device(s), interface(s), server(s), repository(ies), or the like that display industrial automation data.

A controller in control environment 110 can be embodied in one of a programmable automation controller (PAC), which can be a dedicated programmable logic controller (PLC); a PC-based controller; or the like. Control code and control data structures in the control environment 110 represent control logic that administers equipment 140, and related processes, functionally coupled to the control environment 110. In an aspect, control environment 110 is an industrial automation control environment and the control logic is automation control logic. Control environment 110 includes a design environment in which control logic is developed and a runtime environment in which the control logic is implemented (e.g., executed). In the design environment, in an aspect, instruction(s), data type(s), and metadata tag(s) that comprise control code are produced and retained as part of configuration, or composition, of a control project. Likewise, rendering environment 120 includes a design environment and a runtime environment; the design environment enables generation of operator interfaces than can render information associated with the entities or processes regulated via the control environment 110.

According to one embodiment, the binding component 130 enables the definition of a graphic element, for example, an externally defined graphic element (EDGE), to be utilized against a broader set of data types. Typically, the binding component 130 provides "Type Mappings" that enable alternative data types to be employed as bindings for properties of an EDGE definition, for example, specified by a designer. Moreover, the EDGE can employ both a primary data type defined by the property in the EDGE definition and the data type(s) defined in the type mappings. Accordingly, the binding component 130 provides additional flexibility for both the designer of the EDGE definition (e.g., who can include type mappings as part of the EDGE) and the end user/customer (e.g., who can define additional type mappings relative/customized to his system). Although one or more embodiments disclosed herein refer to EDGEs, it can be appreciated that the embodiments can be applied to most any graphic element and are not limited to EDGEs. As an example, the graphic element can include an icon, an animated image, a sound file or other aural indicia, a screen or display, a faceplate, a navigation panel, or the like.

Figure 2:
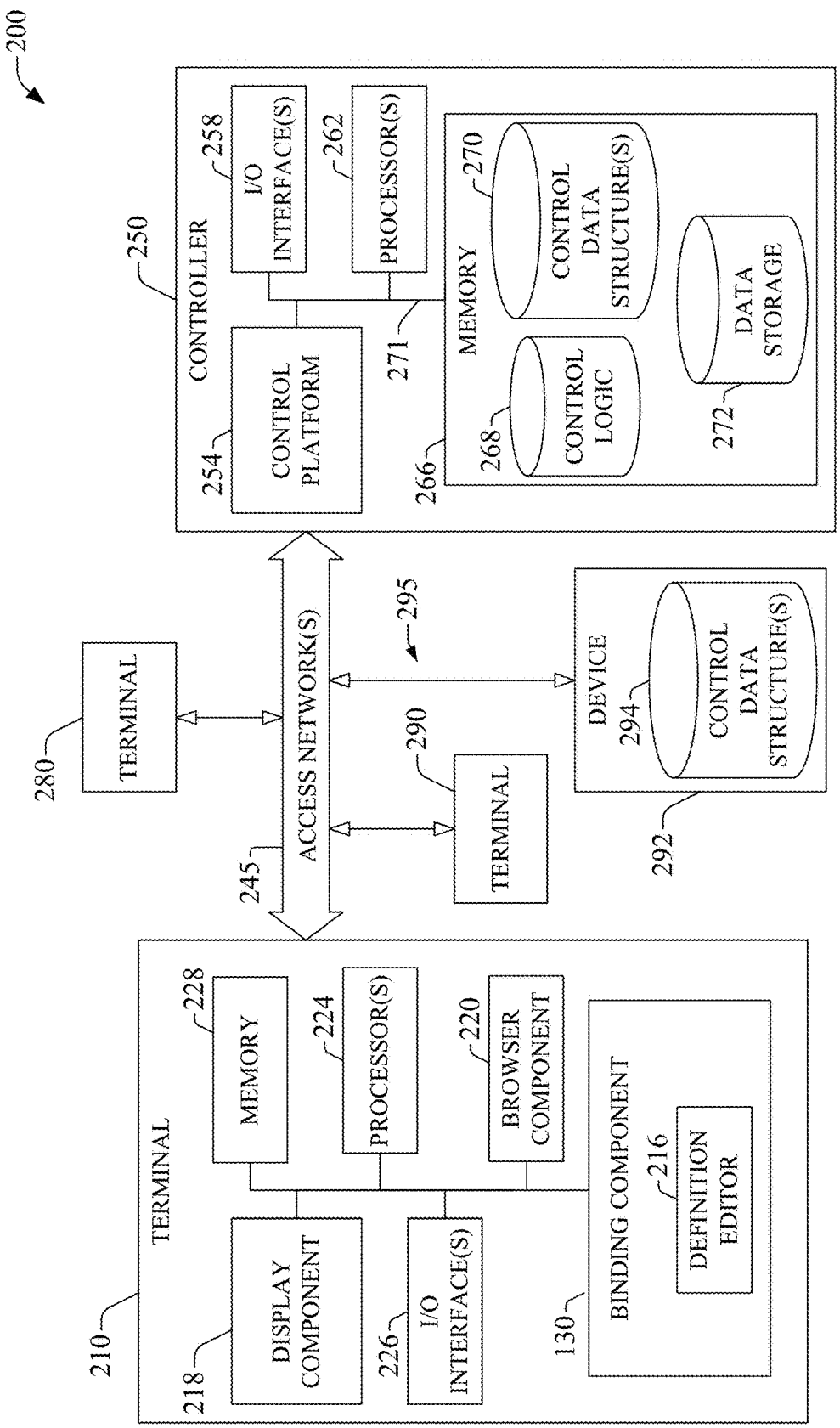
FIG. 2 illustrates an example system that enables and exploits mapping graphic element definitions to controller data types, in an industrial automation system.

FIG. 2 illustrates an example industrial control system 200 that enables and exploits mapping graphic element definitions to controller data types, in a control system in accordance with aspects disclosed herein. Terminal 210 can be part of a rendering environment (e.g., 120) within the control system 200 and can include a set of components that enable, at least in part, the functionality of displaying an instance of the graphic element and a bound tag. In example system 200, terminal 210 is communicatively coupled to a controller 250 via access network(s) 245. In an aspect, the access network(s) 245 can be geographically distributed and can include one or more of a wireline network or a wireless network that operate in accordance with one or more protocols—for example, packet-based protocols such as internet protocol (IP), transmission control protocol (TCP), Ethernet, Ethernet TCP/IP, Control and Information Protocol (CIP) also referred to as Ethernet/IP, X.25, Asynchronous Transfer Mode (ATM) protocol, frame-based protocols such as frame relay, and circuit-switched protocols) include service network(s) and control network(s).

Controller 250 is part of a control environment (e.g., 110) within the control system, and includes a control platform 254 that enables the controller 250 to regulate equipment (e.g., 140) and associated process(es) in accordance with control code retained in control logic storage 268, also referred to as control logic 264. Control data related to regulation of the associated process(es) can be retained in data storage 272; other data also can be retained in data storage 272. The control code is based on one or more control data structures that are part of a set of control data structures available to program the controller 250. The set of control data structures is extensible and specific to controlled equipment and related process(es). In an aspect, a control data structure comprises a control instruction, a data type, and a memory tag. As an example, a memory tag, or tag, can be a composite data structure that includes (a) metadata (e.g., tag metadata) that defines the data related to the memory tag and (b) a data value(s). Control data structure(s) storage 270 retains control data structure(s). Typically, the data type includes at least one of various common types employed in control systems, such as numerical data (real data, integer data, complex data, etc.) and logical data, character data, in addition to user defined data types such as array (vectors, matrices, etc.) data types or composite data types, e.g., a data type with a logical variable and an array data type. In one aspect, these control data structures are bound (e.g., mapped/linked) to one or more properties of a graphic element (e.g., EDGE) definition.

Controller 250 also includes input/output (I/O) interface(s) 258 that enable generation of the control code. I/O interface(s) 258 also allows communication amongst the controller 250 and terminal 210 and the controller 250 and device(s), such as sensor(s) (not shown); such communication effected in part through access network(s) 245. In an aspect, at least one I/O interface of I/O interface(s) 258 is associated with a group of I/O module(s) that can be retained in memory 266 as one or more sets of computer-executable code instructions (not shown). The group of I/O module(s) enables the at least one I/O interface, and thus controller 250, communicate and control I/O functionality (which can be defined in the group of I/O modules). In addition, controller 250 includes processor(s) 262, memory 266, and other circuitry that enables implementation of control process(es) (e.g., execution of control logic, or control code instructions) related to a specific equipment (e.g., 140). In one or more embodiments of the subject disclosure, controller 250 is an industrial controller or an industrial automation controller. Generally, industrial controllers or industrial automation controllers are purpose-specific processing devices employed to regulate automated or semi-automated entities such as industrial processes, machines, manufacturing equipment, plants, or the like. A typical industrial controller or automation controller executes, through a processor(s) 262, for example, control logic to measure one or more variables or inputs representative of a status of a controlled entity, or effectuate outputs associated with control of the entity. Such inputs and outputs can be digital or analog; inputs and outputs are not shown in FIG. 2 for the sake of simplicity.

In example system 200, terminal 210 includes a display component 218 that presents an instance of the graphic element (e.g., EDGE) with an associated tag value, for example, received from the controller 250. Typically, the definition of the graphic element (e.g., EDGE) can be mapped with one or more data types associated with the controller 250. In an aspect, the type mapping described herein can be generated one time (e.g., at a time terminal 210 is manufactured or provisioned), for example, by employing the binding component 130, and it can be utilized at runtime (control runtime, rendering runtime, or both) to create a variety of collections of display objects based on control logic, as described hereinbefore. In one aspect, the type mapping can be retained in the binding component 130. Although the binding component 130 is illustrated to reside within the terminal 210, it can be appreciated that the binding component 130 can reside outside the terminal 210, for example, on most any server/memory within system 200 or within controller 250. As an example, the type mapping can link a property in the definition of a graphic element (e.g., an icon, an animated image, a screen or display, a faceplate, navigation panel) to the data type. In one aspect, a definition editor 216 can be utilized to modify property types on the definition of the graphic element (e.g., EDGE definition) as well as the internal elements within the definition. Moreover, the definition editor 216 can be employed to define controller data types as properties of the definition. Typically, when defining bindings in the internal elements of the graphic element, a browser component 220 that can provide a data type browser can be utilized by the definition editor 216 to locate the appropriate members of structure. In one aspect, the browser component 220 can provide the ability to browse data types, graphic element definitions (e.g., EDGEs), tags, and/or graphic element instances (e.g. elements on screens). Further, the definition editor 216 can provide various functions, such as, but not limited to, design-time validation to identify binding problems, Intellisense, look-ahead, and/or auto-fill, verification and/or validation, ename tracking and/or propagation, run-time binding verification, etc.

An available collection of graphic elements (e.g., EDGEs) for a specific product/ project associated with controller 250 can be obtained by display component 218, wherein the display component 218 can generate a rendering project based at least on such collection. Display component 218 can execute the rendering project to produce an operator interface; in an illustrative aspect, display component 218 can exploit processor(s) 224 to execute the rendering project. The operator interface so generated is thus based at least on the control logic executed by controller 250. In addition, display component 218 can enable data entry from an end user (e.g., a customer, a control engineer or operator); for example, display component 218 can receive data input through various user-interface interaction modalities (speech gestures, motion gestures, touch gestures, etc.) and conduits, for example, keyboards, keypads, touch screens, microphones, cameras, or the like.

One or more operator interfaces generated as described herein enable terminal 210 to render control data associated with various control processes regulated through controller 250 based on specific control code. The display component 218 in terminal 210 can render the one or more operator interfaces through visual or aural indicia. The one or more operator interfaces can be associated with one or more sets of control screens, and rendered in accordance with at least one of graphic display object(s) or gesture rendering object(s) that compose the control screen(s) in the one or more sets of control screens. Various schemes can be employed to render the one or more operator interface(s) or other content(s) such as window-based schemes, e.g., iconic representation, pop-up representation of indicia; or text-based representation, with scroll-down or scroll-sideways delivery, or static rendering. In addition, the one or more operator interfaces or other content(s) can be organized in various configurations within a rendering area (e.g., display screen) that can be a part of display component 218.

In terminal 210, at least a portion of I/O interface(s) 226 enables functional coupling, e.g., communicative coupling, of terminal 210 with access network(s) 245; the functional coupling allows communication (e.g., exchange of data and signaling) of terminal 210 with other controller(s) (e.g., controller 250); other terminal(s) such as terminal 280 and terminal 290; device(s), such as device 292; and/or server(s) (not shown). In an aspect, device 292 is functionally coupled to access network 245 via interface(s) 295, and includes at least one control data structure retained in memory element 294. In addition to control data structure(s) 294, device 292 also includes data storage (not shown). In an embodiment, device 292 can be an intelligent device, such as a variable speed drive for a motor or an intelligent valve. In another embodiment, device 292 can be an I/O device, such as various sensors, a scanner, a key pad, a touch pad, or the like. In one or more embodiments, device 292 can include at least one data structure, other than a control data structure, that can be exploited to automatically generate an operator interface in accordance with aspects described herein. Device 292 can be part of equipment 140.

The portion of I/O interface(s) 226 that enables communication of terminal 210 with other terminal(s), controller(s), or server(s) via access network(s) 245 can include network adaptor(s), port(s), reference link(s), or the like. I/O interface(s) 226 also can functionally couple (e.g., communicatively couple) the terminal 210 with peripheral devices (e.g., device 292) and with an electric grid that can supply power for operation of the terminal 210. To at least that end, I/O interface(s) 226 can include a set of connectors and suitable circuitry (transformers, power amplifiers, etc.). In an aspect, I/O interface(s) 226 can be distributed and deployed in part within display component 218 to enable acquisition of data in response to conveyance of control data through one or more operator interfaces. The portion of I/O interface(s) 226 that is part of display component can be embodied in data entry components, e.g., keypad, touch detection components, and related circuitry that enables functional coupling of the portion of I/O interface(s) 226 with one or more components or functional elements (e.g., processor(s), memory, bus) of terminal 210.

In example system 200, terminal 210 also includes processor(s) 224, which can be configured to execute or can execute computer-executable code instructions (not shown) stored in memory 228 to implement or provide at least part of the described functionality of terminal 210. Such computer-executable code instructions can include program modules or software or firmware applications that implement specific tasks which can be accomplished, for example, through one or more of the methods described in the subject specification and that are associated, at least in part, with functionality or operation of example system 200. Memory 228 also can retain data resource(s) retrieved or received at least from controller 250 or other controller(s) (not shown). In addition to, or as part of, stored data resources, memory 228 also can retain state information (e.g., alarm condition(s)) associated to a terminal, a controller, a device, or other equipment. In an aspect, memory 228 can include various graphic elements (e.g., EGDGEs) definitions or gesture data object definitions.

Figure 3:
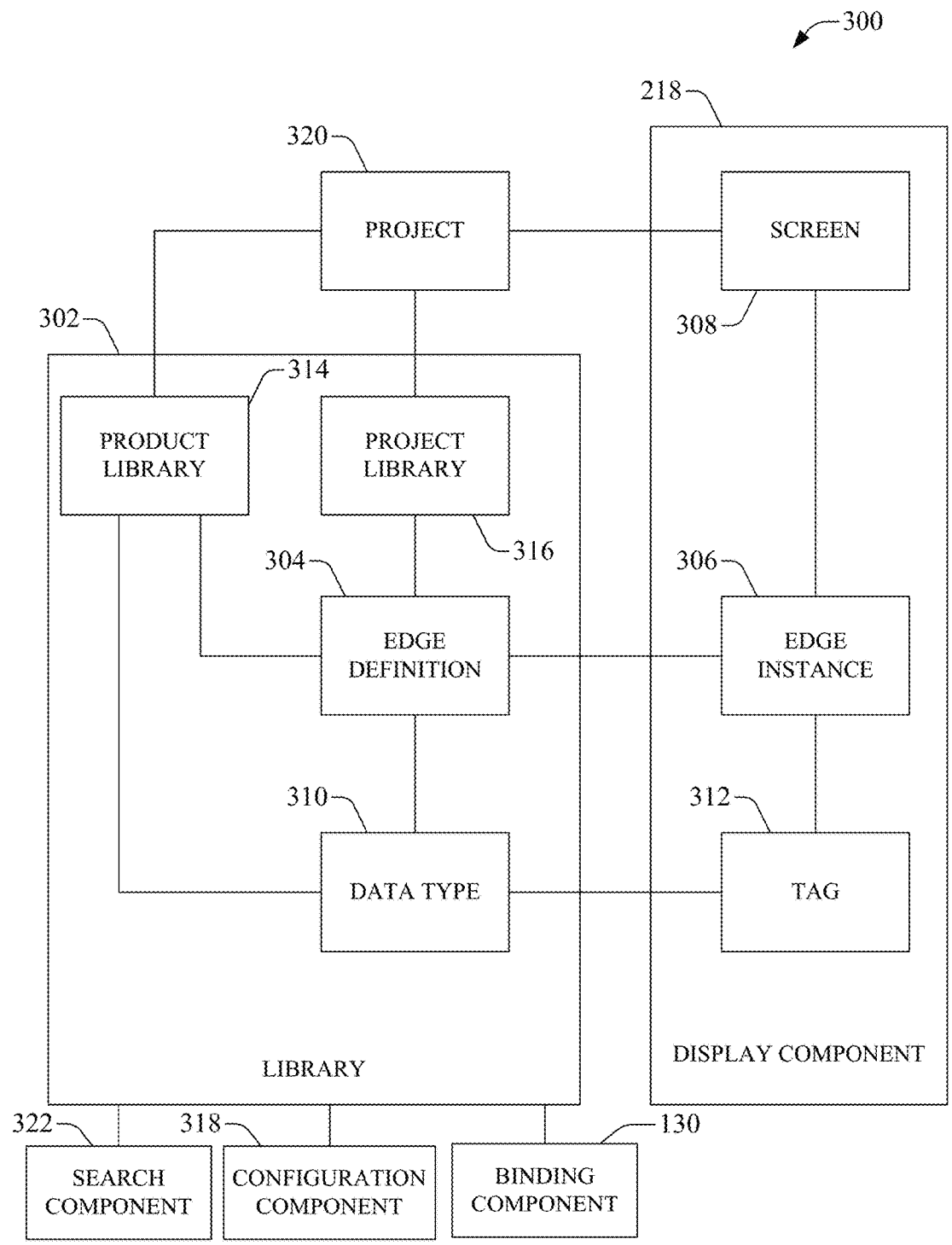
FIG. 3 illustrates an example system overview of the resources in a project and its associated product and project libraries in an industrial automation environment.

Referring now to FIG. 3, there illustrated is an example system overview 300 of the resources in a project and its associated product and project libraries. As discussed supra, the display component 218 presents an instance of a graphic element, such as, but not limited to, an EDGE. In one aspect, an EDGE can be most any graphic element developed by an external group, for example, a third-party, an original equipment manufacturer (OEM), etc., via a configuration component 318. Moreover, a consistent architecture for both EDGE and user-defined graphic elements (UDGE) is provided herein. It can be appreciated that the EDGE property and data type concepts disclosed herein can apply to most any type of graphic elements (e.g., EDGE and/or UDGE). Typically, library 302 includes definitions, for example an EDGE definition 304, which is a definition of an EDGE in an element browser. In one example, the library 302 can include a product library 314 and/or a project library 316 that can store graphic element(s) and/or data specific to a product and/or a project respectively. Typically, the library 302 can be included within memory, for example memory 228 residing within terminal 210 or memory residing within a server, external to, but communicatively coupled with terminal 210.

The EDGE definition 304 can include at least one property that is a discrete (scalar or complex) type exposed by the EDGE definition to its users. In one aspect, the property value can be set by the user when an EDGE instance 306 is created on a screen 308. The user can set (e.g., via the binding component 130) the property value to either a fixed value or can bind (e.g., via the binding component 130) the property value to a dynamic value, such as, but not limited to a controller Tag and/or another EDGE instance on the same screen. Typically, the properties can be either required or optional. In one aspect, a controller data type 310 can be used in an EDGE definition 304 as the type of a property. In one example, the binding component 130 can be utilized to link the controller data type 310 with the EDGE definition 304. In general, a designer (e.g., third party) of the EDGE definition 304 does not know the full range or potential uses for the EDGE definition 304. Moreover, the end user can employ the EDGE definition 304 from the OEM (or other library provider) for data types that are specific to the end user's project. Most often, the designer is unaware of these intended projects in which the EDGE can be utilized. To support this scenario, the types used by properties in the EDGE definition 304 can be extended by users of it, but in a manner such that the EDGE definition remains intact. In one aspect, "Type Mappings" are utilized for binding data types 310 to properties of the EDGE definition 304, for example, by employing the binding component 130. This enables the definition 304 of a single EDGE to be used against a broader set of data types 310. Moreover, the type mappings do not impact the visual layout because bindings in the visual layout can only refer to properties of the EDGE definition 304; they are isolated from the details of the mappings. In one embodiment, the data type 310 can be a structure; for example, a complex type. Moreover, the data type 310 definition can include system-defined, user-defined, Add-On Instruction (AOI)-defined, and/or module-defined data types, as explained in detail infra.

Properties can define the interface (e.g., a collection of properties that an EDGE exposes to its users.) of the EDGE definition 304 to a user. In one aspect, the properties of the EDGE definition 304 can be extended in various areas, for example, property types can include controller data types and/or additional flexibility. Typically, strongly-typed properties are provided for complex data structures or scalars. Further, loosely-typed properties are provided for scalar types (e.g., anyNum). Furthermore, un-typed properties are provided for deferred connectivity and/or parameter substitution. In one example, meta-information that designates a property as "required" or "optional" to support design-time validation and/or conditional bindings in the EDGE definition 304 can also be provided. In another example, meta-information that provides a hint/indication that the property is intended to be bound to a live data value can be provided. Additionally, the EDGE definition 304 can support multiple complex properties (e.g., multiple controller data types). When doing so, the user can select/set a default binding for one property that references another property (e.g., via the binding component 130).

According to an aspect, during run time, an EDGE instance 306 can be displayed on various screens 308 for displaying data from a tag 312. In one example, when the EDGE definition 304 is instantiated 306, the data type in a strongly-typed property must exactly match the data type of the bound tag 312. Using strongly-typed properties provides the greatest opportunity for an integrated design-time experience. For example, strongly-typed properties enable design-time features for the EDGE definition 304, such as, but not limited to, Intelli-sense, look-ahead, and/or auto-fill, verification and/or validation, rename tracking and/or propagation for data types 310 and their members. In scenarios where the designer of the EDGE definition 304 and the end user of that EDGE are more decoupled, the end user may want to use the EDGE in a screen 308, but the data types of the EDGE it are not a good fit for the current project 320, product or system. In such a case, the type mapping mechanisms described herein can be used to map between types. Alternatively, the EDGE designer can select to use loosely or un-typed properties to provide additional flexibility. In another example, when the EDGE definition 304 is instantiated 306 in the design-time or displayed on a screen 308 in the run-time, the system must verify that the conversion from data type in the bound tag 312 to the data type 310 in the property is valid. The design-time provides the ability for early validation and/or feedback for the user, but is not the final authority on whether or not the conversion is valid. The final decision occurs in the run-time system to validate that the on-line tag value can be appropriately converted.

Loosely-typed properties can generally be utilized for scalar data types and do not apply to complex or structured types. Typically, loosely-typed properties provide greater flexibility in supporting a range of data types. However, when multiple property bindings are needed, multiple, scalar bindings would need to be created, rather than employing a structure. Generally, use of loosely-typed properties is well suited for simple, scalar values, but is not the recommended approach for complex or structured types. Many of the loop Tag itself. If the PIDE loop does not have that metadata configured, then the user can manually configure the binding of the autoTune tag. The instance 306 of the EDGE can be created on a screen 308, as follows:

```
<TemperatureLoop name="TempLoop_201">
    <dataPIDE>{::Controller_1\PIDE_201}</dataPIDE>
    <!-- Binding to the autoTune property defaults to using the value in:
    <autoTune type="PIDE_AUTOTUNE">{::Controller_1\PIDE_201.@AutoTune}</autoTune>
    -->
</TemperatureLoop>
<TemperatureLoop name="TempLoop_202">
    <dataPIDE>{::Controller_1\PIDE_202}</dataPIDE>
    <autoTune>{::Controller_1\GlobalAutoTuneTag}</autoTune>
</TemperatureLoop>
``` benefits for strongly-typed properties are not available on the EDGE definition 304 because the type of the binding is not known until instantiation time. In addition, un-typed properties can be utilized to support string substitution. This allows a parameter value to be expanded to complete the connection to external data. Though again, all of the above noted benefits realized by strongly-typed properties are lost when using this approach. Much like loosely-typed properties, enhanced features on the EDGE definition 304 are not available because the type of the binding is not known until instantiation time.

According to one aspect, the EDGE definition 304 can support multiple data types 310. Consider the following example to better illustrate some of the user interactions and how the disclosed architecture supports them. In this example case, the user designed EDGE definition 304 can have several complex properties based on structured data types 310:

```
<Typedef id="TemperatureLoop" baseType="Group">
    <meta:displayName>Temperature Loop with AutoTune
    Stuff</meta:displayName>
    <Properties>
        <Property id="dataPIDE" type="PID_ENHANCED">
            <meta:displayName>Temperature Loop PIDE
            Tag</meta:displayName>
            <meta:category>General</meta:category>
            <meta:connectionOnly>true</meta:connectionOnly>
            <meta:required>true</meta:required>
        </Property>
        <Property id="autoTune" type="PIDE_AUTOTUNE"
        src="dataPIDE.@AutoTune" >
            <meta:displayName>PIDE Auto Tune
            Tag</meta:displayName>
            <meta:category>General</meta:category>
            <meta:connectionOnly>true</meta:connectionOnly>
            <!-- Omitting the required element means that it is
            optional
            <meta:required>false</meta:required>
            -->
        </Property>
        <!-- ... -->
    </Properties>
</Typedef>
```

It can be appreciated that the example extensible markup language (XML) code utilized herein is simply one example and that the subject specification is not limited to utilizing XML. The above example EDGE definition 304 is designed with multiple properties for: (i) the tag of an enhanced proportional-integral-derivative (PIDE) loop (dataPIDE) which is "required;" and (ii) the AutoTune tag of the PIDE loop (autoTune) which is "optional." By default, the auto-Tune tag is retrieved from the meta-data of the dataPIDE As can be seen above, the example EDGE definition 304 includes one required and one optional property. The required versus optional designation serves several purposes, for example, provides a cue for the design-time validation system to identify binding problems, and/or provides the mechanisms for the designer of the EDGE definition 304 to develop conditional visualizations based on whether the property is bound or not. Typically, optional properties can necessitate additional constructs for the designer of the EDGE definition 304 to make decisions based on a property's binding. In other words, the property binding can be set or null, a valid type or an invalid type, a temporarily invalid or with bad quality (e.g., due to a transient communication error). Accordingly, in the above example, the visual layout can have conditional bindings such as:

```
<View>
    <!-- ... -->
    <Button id="LaunchAutoTuneView" >
        <SetProperty ref="visibility"
            src="{(autoTune != null) && (autoTune.@Quality ==
            Quality.Good)}" />
        <!-- ... -->
    </Button>
    <!-- ... -->
</View>
```

In one aspect, a user can also configure (e.g., via the binding component 130) type mappings for the PID_ENHANCED and PIDE_AUTOTUNE types. Moreover, if any data type that supplies the required data fields is to be supported, an un-typed type mapping (or an un-typed property if configured in the EDGE properties) can be utilized, as follows:

```
<TypeMappings>
    <TypeMap to="PID_ENHANCED" from="anyType" />
    <TypeMap to="PIDE_AUTOTUNE" from="anyType" />
</TypeMappings>
```

The above type mappings enable binding any structure that supports the fields of the PIDE used in this example EDGE definition 304. Typically, the type mappings provide support for un-typed data for the EDGE definition 304. This means that the EDGE definition 304 can be used with any tag 312 that supports the SP, PV, etc. fields used in the EDGE definition 304 and visuals. This provides added flexibility at the cost of deferring validation and verification to the run-time. In addition, strongly-typed mappings are also supported.

```
<TypeMappings>
    <TypeMap to="PID_ENHANCED"
    from="MyTempLoopAOI">
        <Map to="PID_ENHANCED.PV"
        from="{MyTempLoopAOI.mySpecialPV}" />
        <Map to="PID_ENHANCED.SP"
        from="{MyTempLoopAOI.mySpecialSP}" />
        <!-- ... -->
    </TypeMap>
    <TypeMap to="PIDE_AUTOTUNE"
    from="MyTempLoopAOI">
        <Map to="PIDE_AUTOTUNE"
        from="{MyTempLoopAOI.@AutoTuneInOutParam}" />
        <!-- ... -->
    </TypeMap>
</TypeMappings>
```

The above type mappings enable binding to a Add-On Instruction (AOI) definition that has different parameters than a PIDE loop structure. This type mapping binds to an InOut parameter of the AOI. In this example, the AOI includes an InOut parameter where the user can pass in an AutoTune tag. The InOut parameter is accessed via the meta-data of the AOI. When all the type mappings are defined, the example EDGE definition 304 can be utilized with (i) PID_ENHANCED—an enhanced PIDE and its auto-tune Tag; (ii) anyType—an un-typed property to be used with any complex type with the specified bindings; and/or (iii) MyTempLoopAOI—a custom Add-On instruction, as shown below:

```
<TemperatureLoop name="TempLoop_203">
    <dataPIDE type="anyType">{::Controller_1\Supports_PIDE_Members}</dataPIDE>
    <autoTune type="anyType">{::Controller_1\Supports_AutoTune_Members}</autoTune>
</TemperatureLoop>
<TemperatureLoop name="TempLoop_204">
    <dataPIDE type="MyTempLoopAOI">{::Controller_1\MyTempLoopAOI_204}</dataPIDE>
    <!-- Binding to the autoTune property defaults to using the value in:
<autoTune
type="PIDE_AUTOTUNE">{::Controller_1\MyTempLoopAOI_204.@AutoTuneInOutParam}</auto
Tune>
    -->
</TemperatureLoop>
```

In another example, a valve can be represented by a simple EDGE that corresponds to an AOI. Moreover, the AOI can be the definition of the control logic and the EDGE can be the definition of the HMI visualization. In one aspect, the EDGE definition can provide an ability to specify more than one visualization for an EDGE. For example, visualizations can be displayed for an icon, overview, and/or configuration of the EDGE. In yet another example, EDGE definition 304 can be defined, via configuration component 318, such that, the EDGE definitions 304 can connect with many data values from many different data types, and/or be built as composites of other EDGEs. For example, a tank overview can be developed as an EDGE, wherein data is drawn from the primary tank of interest, secondary tanks/silos containing material feeds, and individual equipment such as valves and pumps. Typically, many, if not all of these items, are typically modeled with a data type for each item (e.g., Tank_UDT, Silo_UDT, ValveAOI, etc.). In another example, a conveyor can be developed as a composite EDGE with multiple connections.

According to an aspect, several scenarios related to creating EDGE instances on a screen can be provided by system 300. In one aspect, a user (e.g., via terminal 210) can drag the EDGE definition 304 from an element library (e.g., product library 314 and/or project library 316) to a screen 308. Typically, when the EDGE definition 304 is dropped onto the screen, a filtered list of tags 312 that match the EDGE's properties can be displayed (e.g., via display component 218). In one embodiment, a search component 322 can be utilized search the project database (e.g., including product library 314 and/or project library 316) for the tags 312 that match the EDGE's data type 310.

In another aspect, the user (e.g., via terminal 210) can drag a tag 312 from a tag browser (not shown) to the screen 308 and, when the tag 312 is displayed on the screen 308, a filtered list of EDGE definitions 304 that match (are bound to) the tag's data type 310 can be presented to a user (e.g., via display component 218). Additionally or alternatively, the element library (e.g., product library 314 and/or project library 316) can be filtered based on a data type 310 and/or a tag 312 for the selected EDGE definition 304. In other words, when instantiating an EDGE definition 304, only those tags 312 are displayed that can be used with that EDGE. Further, when searching for/selecting a tag 312, a list of all of the EDGE definitions 304 that can be utilized with that tag 312 can be displayed along with the tag 312.

Figure 4A:
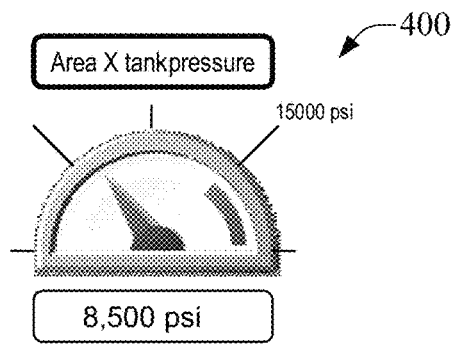
FIGS. 4A-E illustrate example screenshots relating to a visual layout of an example graphic element definition in accordance with one or more aspects disclosed herein.
Figure 4B:
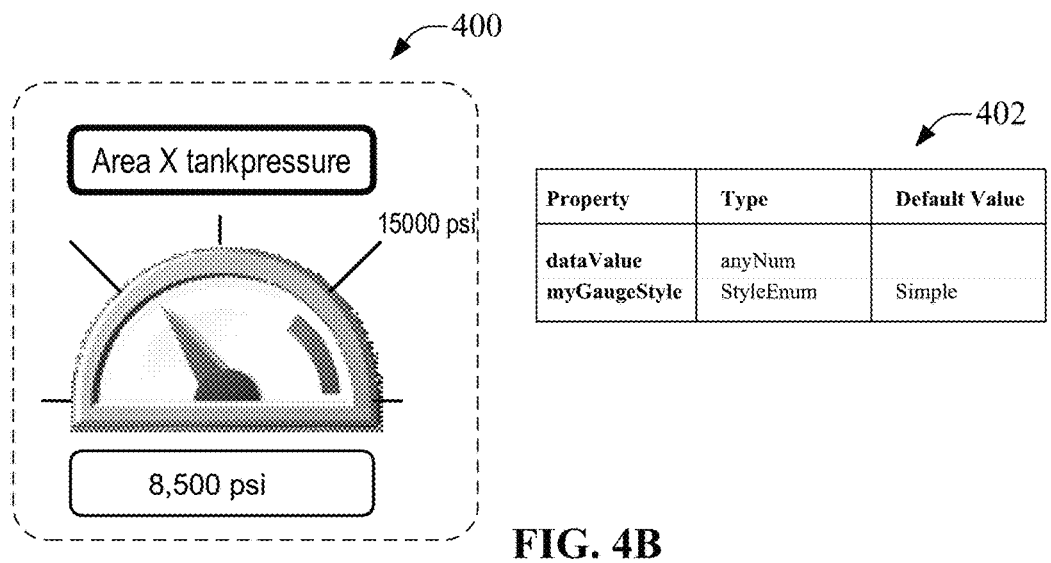
Figure 4C:
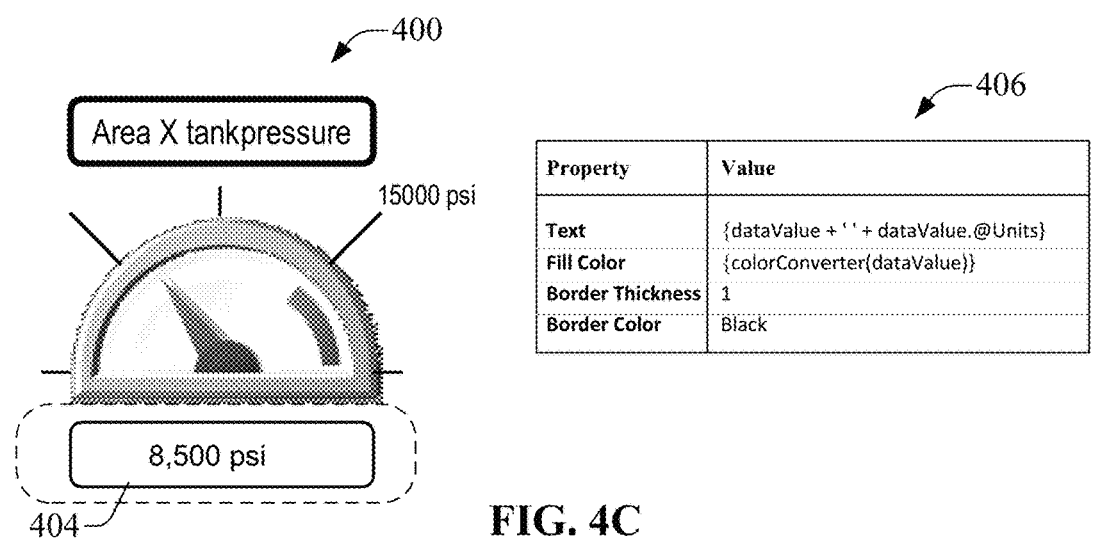

FIG. 4A illustrates an example instance of a graphic element 400, for example, an EDGE representing a gauge in an industrial control system. In an example, the gauge can be monitored/controlled by controller 250 and the instance of the gauge can be displayed on terminal 210, by display component 218. It can be appreciated that the gauge is simply one example and the subject innovation is not so limited. The following pseudo XML code example is intended to show the major aspects of EDGE definitions and instances in accordance with an aspect of the subject innovation. The type definition for the gauge EDGE can be described as follows:

```
<Typedef id="SimpleGauge" baseType="Group">
    <meta:displayName>A Simple Gauge EDGE</meta:displayName>
    <meta:description>This Gauge uses a complex property.</meta:description>
    <!-- ... -->
</Typedef>
```

In the above example, the gauge EDGE extends a base Group Graphic Element definition.

In one aspect, properties define the interface of the EDGE definition to its users. When an instance of an EDGE is created on the screen (and selected in the designer), its public properties are available for editing in a property pane (e.g., via the definition editor 216). Each EDGE property has a set of core attributes defined by a run-time data model. For example, the core attributes can include an Identifier (e.g., a localized name of the property), a type (e.g., an expected type of property), and/or a value (e.g., a default value of the property when the user does not specify a value (or when a bound value is not accessible in the run-time)). Each EDGE property can also have meta-information applied to it to support editing behavior in the design-time user interface (typically in the property pane). The meta-information can include, but is not limited to, a display name (e.g., a localized name of the property), a description (e.g., a localized description of the property), a category (e.g., a property pane category/group in which to display the property), a required or optional designation on the property (e.g., defaults to optional), and/or an indication that the property is intended to be bound to a live data value.

Typically, an EDGE designer can choose whether to expose complex or simple (scalar) values for each property. In one case, a property can be configured as a complex value for a controller data type. Alternatively, a set of simple properties for the various members of a complex data type can be exposed. For example, with respect to the gauge EDGE 400, a designer of the gauge EDGE 400 can decide that all of the internals of the Gauge element 400 are opaque and the end user cannot individually configure properties for each item. In other words, the designer can decide that all internal data is driven by a single complex property that connects to some external data. This approach is shown in the example below.

```
<Properties>
    <!-- In this example, a single numeric property to for the data value
    is exposed. -->
    <Property id="dataValue" type="anyNum">
        <meta:displayName>Gauge Data Tag</meta:displayName>
        <meta:category>General</meta:category>
        <meta:connectionOnly>true</meta:connectionOnly>
        <meta:required>true</meta:required>
    </Property>
    <!-- The EDGE designer chose to expose some properties to
        configure the visual appearance of the EDGE. -->
    <Property name="myGaugeStyle" type="StyleEnum"
    value="Simple">
        <meta:displayName>Visual Style of the Gauge (Simple, Fancy,
        etc)</meta:displayName>
        <meta:category>Layout</meta:category>
    </Property>
    <!-- ... -->
</Properties>
```

In this example, a single numeric property (dataValue) for the data value is exposed. This is a loosely-typed property that can be a real data, integer data, complex data, etc. value from a controller data type, or a numeric value from another data source such as, but not limited to an electronic operator interface (EOI) tag or other graphic element.

According to an aspect, the below XML example depicts a visual layout of the gauge element 400. Typically, the binding statements for internal display elements (shown in the curly braces syntax) in the visual layout refer to properties of the EDGE definition (using the property identifiers). These bindings can refer to any properties in the EDGE definition including, but not limited to, the members of complex property values (e.g., controller data types).

```
<View>
<!-- Ignoring all layout aspects such as width, height, x, y, etc... -->
<!-- "Area X tank pressure" -->
<TextDisplay id="_description">
    <SetProperty ref="fillColor"        value="white" />
    <SetProperty ref="borderThickness" value="3" />
    <SetProperty ref="text"         src="{dataValue.@Description}" />
</TextDisplay>
<!-- "0" on the left side of the Gauge -->
<TextDisplay id="_min">
    <SetProperty ref="fillColor"        value="transparent" />
    <SetProperty ref="borderThickness" value="0" />
    <SetProperty ref="text"         src="{dataValue.@Min}" />
</TextDisplay>
<!-- "15000" on the upper right side of the Gauge -->
<TextDisplay id="_max">
    <SetProperty ref="fillColor"        value="transparent" />
    <SetProperty ref="borderThickness" value="0" />
    <SetProperty ref="text"         src="{dataValue.@Max + ' ' + dataValue.@Units}" />
</TextDisplay>
<!-- Red Gauge arror rotating according to the current value -->
<Line id="_arrow" width="10" color="red" style="solid">
    <SetProperty ref="fgColor"          value="red" />
    <SetProperty ref="weight"           value="4" />
    <SetProperty ref="style"        value="solid" />
    <SetProperty ref="rotation"         src="{(dataValue/(dataValue.@Max-dataValue.@Min))*135}"/>
</Line>
<!-- "8,5000 psi" on the bottom of the Gauge -->
<TextDisplay id="_value">
    <SetProperty ref="fillColor"        value="Green" src="{colorConverter(dataValue)}" />
    <SetProperty ref="borderThickness" value="1" />
    <SetProperty ref="text"         value="" src="{dataValue + ' ' + dataValue.@Units}" />
</TextDisplay>
</View>
<Behaviors>
<Function id="colorConverter" parameter="arg0" type="anyNum">
    <!-- Assume that there is a "global" Color table with at least the fields below -->
    <![CDATA[
        if (arg0 <= arg0.@Min) return Colors.Alarm.Lo; <!-- red -->
        if (arg0 >= arg0.@Max) return Colors.Alarm.Hi; <!-- red -->
        return Colors.OK; <!-- green -->
    ]]>
```

```
</Function>
</Behaviors>
```

In this example scenario, the meta-data fields of the anyNum type (shown by the .@ syntax) are referenced in the bindings of the gauge element 400. When the binding of the dataValue property is configured by the end user, all of the binding expressions on the internal HMI elements subsequently bind to the meta-data of the bound Tag.

Figures 4D, 4E:
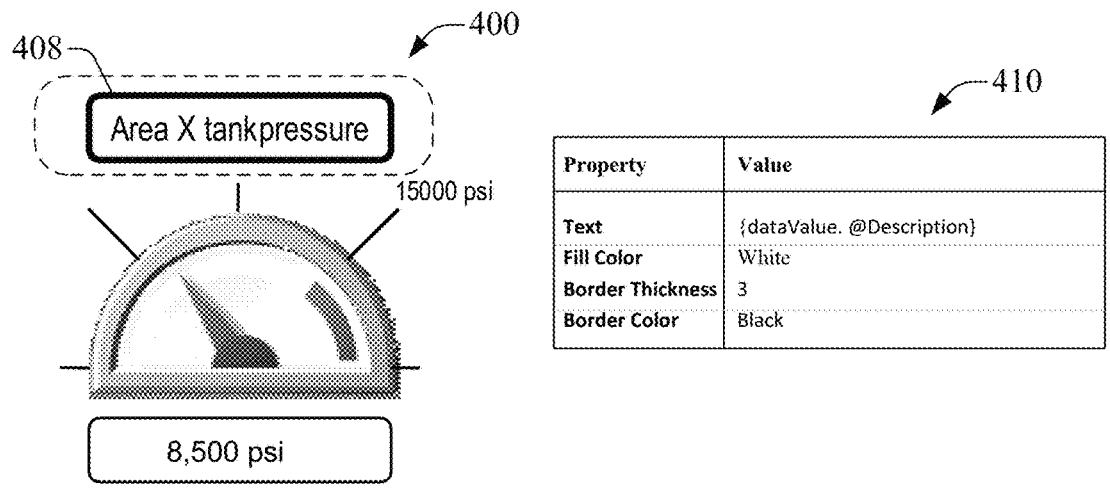

Referring back to the drawings, FIGS. 4B-E illustrate example screenshots that depict editing of a visual layout of an example gauge EDGE definition, for example, in a design-time user interface. In one aspect, when the instance of the gauge EDGE 400 is selected, as shown by a dotted line in FIG. 4B, public properties of the EDGE definition are displayed in a property pane 402. Further, when an HMI element (404, 408) within the EDGE 400 is selected, the properties of that element are displayed in respective property panes (406, 410). For example, in FIG. 4C, properties, such as, but not limited to, "text," "fill color," "border thickness," and "border color" associated with HMI element 408, along with values of the respective properties are displayed in property pane 406, on selection of the HMI element 404. In another example, in FIG. 4D, properties, such as, but not limited to, "text," "fill color," "border thickness," and "border color" associated with HMI element 408, along with their corresponding values are displayed in property pane 410, on selection of the HMI element 408. Another useful view displayed in the editor (e.g., definition editor 216) is that of the dataValue property 412, as depicted in FIG. 4E. Moreover, this view can depict all the internal properties that reference the external data type/external property. As an example, this cross-referencing can be performed by the binding component 130.

FIGS. 5A-C illustrate example screenshots that depict configuration of properties of an example gauge EDGE, according to an aspect of the subject specification. In one example, when a user wants to utilize the EDGE on a screen, an instance of the EDGE is created, for example, via drag/drop or other user interface (UI) mechanisms. Further, the user can configure properties of the EDGE by selecting different HMI elements of the EDGE. Conceptually, an instance of the gauge EDGE can be expressed as follows when bound to a controller Tag value:

```
<SimpleGauge name="Gauge_101">
    <dataValue>{::Controller_1\PressureSensor_101}</dataValue>
</SimpleGauge>
```

In the property pane 502, the dataValue property could be visualized as shown in FIG. 5A.

Internal to the EDGE, the data bindings are set based on the configuration of the above binding. For example, if the internal HMI elements (404, 408) are selected, as shown in FIGS. 5B-C, the resulting bindings of those HMI elements (404, 408) are displayed in the respective property panes (406, 410). As described supra, during creation of the EDGE definition, the full range or potential uses for the EDGE definition are generally not known. In other words, the end user can employ the EDGE definition for data types that are specific to the user's project, other than the intended data types thought of by an EDGE designer during creation of the EDGE definition. To support this scenario, in one aspect, the types employed in the properties of the EDGE definition can be extended by the end users, in a manner such that the EDGE definition remains intact.

Type mappings provide a mechanism for utilizing alternative data types as bindings for properties of an EDGE definition. This enables the definition of a single EDGE to be used against a broader set of data types. That is, the EDGE can work with both a primary data type defined by a property in the EDGE definition and the alternate data types defined in the type mappings. This mechanism provides additional flexibility for both the designer of the EDGE definition and the end user. Returning to the gauge EDGE example, consider an example scenario wherein the designer of the EDGE definition wanted to support a TIMER data type for the dataValue property (which is of anyNum type). In this example scenario, the designer can define a type mapping as part of the EDGE definition as follows:

```
<TypeMappings>
    <TypeMap to="anyNum" from="TIMER">
        <Map to="anyNum"              from="{TIMER.ACC}"           />
        <Map to="anyNum.@Description" from="{TIMER.@Description}"  />
        <Map to="anyNum.@Min"         from="0"                     />
        <Map to="anyNum.@Max"         from="{TIMER.PRE}"           />
        <Map to="anyNum.@Units"       from="msec"                  />
    </TypeMap>
</TypeMappings>
```

Typically, the above mapping can include several fixed values in the place of some bindings, for example, when the data type being mapped from does not support all of the fields of the complex property. In addition, if the end user wants to utilize the gauge EDGE with a data structure employed in his controller, a type mapping can be generated to support that data structures using the same gauge EDGE definition. In this case, the user defined type (UDT) LegacyStructWithMeta is mapped to the anyNum data type, as follows:

```
<TypeMappings>
    <TypeMap to="anyNum" from="LegacyStructWithMeta">
        <Map to="anyNum"              from="{LegacyStructWithMeta.value}" />
        <Map to="anyNum.@Description" from="{LegacyStructWithMeta.descr}" />
        <Map to="anyNum.@Min"         from="{LegacyStructWithMeta.min}" />
        <Map to="anyNum.@Max"         from="{LegacyStructWithMeta.max}" />
        <Map to="anyNum.@Units"       from="{LegacyStructWithMeta.EU}" />
    </TypeMap>
</TypeMappings>
```

In one aspect, the gauge EDGE definition's visual layout is not affected when such type mappings are added. Since the bindings in the visual layout only refer to properties of the EDGE definition, the visual layout is isolated from the details of type mappings. In other words, the visual layout bindings cannot employ any of the type map elements. Moreover, since the type mappings extend the data types supported by the EDGE definition, visualizations in the element browser can also be extended to show the user what types are supported by a given EDGE definition.

Figure 6:
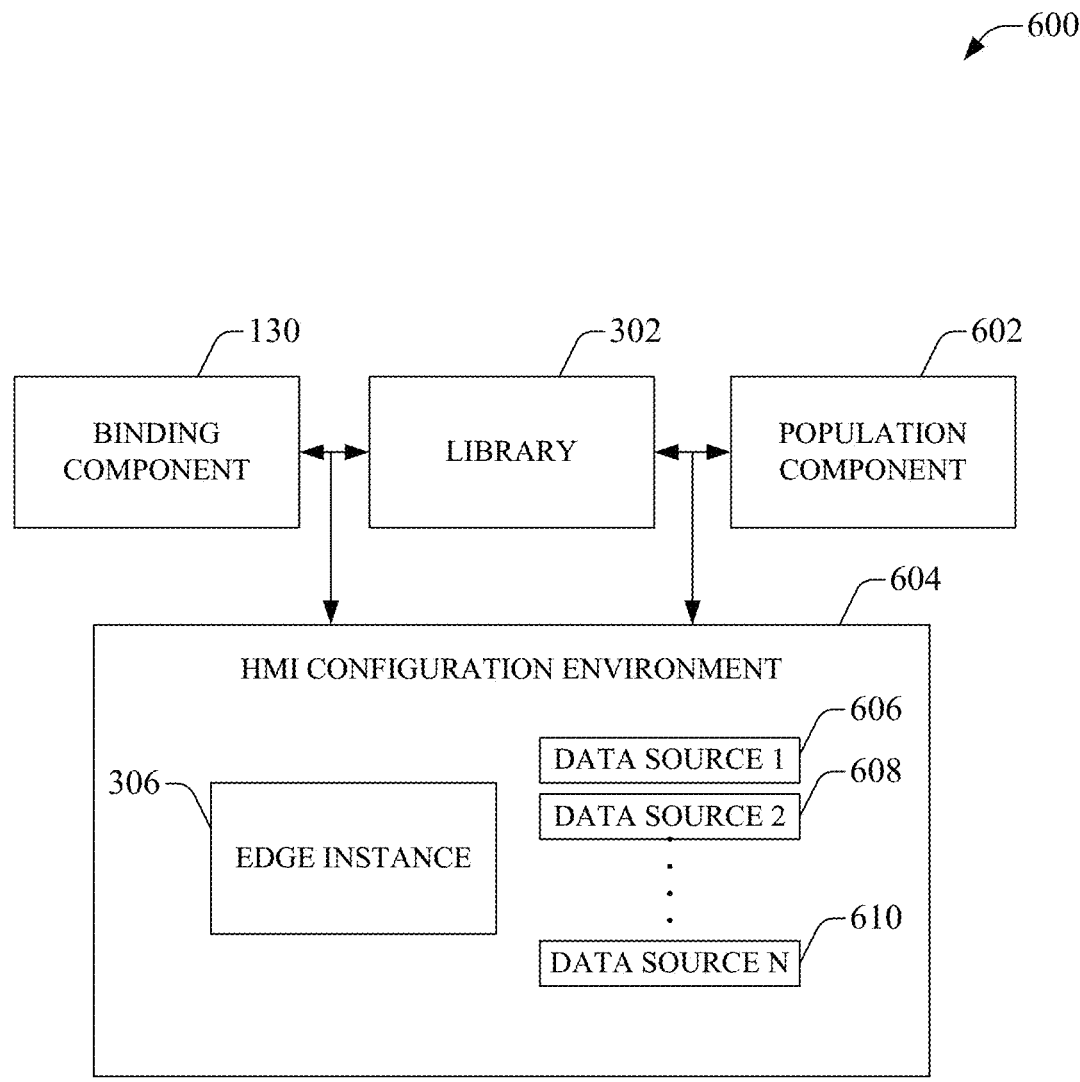
FIG. 6 illustrates an example system that associates an externally defined graphic element (EDGE) definition with the definition of a data source.

The extensibility and flexibility of the type mappings is realized when an instance of an EDGE is created on a screen. With the previously defined type mappings, the gauge EDGE now supports the anyNum, LegacyStructWithMeta and TIMER data types. Instances can be created using any of these types. For example, Referring now to FIG. 6, there illustrated is an example system 600 for associating an EDGE definition with the definition of a data source. Typically, graphic displays in HMI products can be associated with a data source such as, but not limited to, a controller tag variable. In one aspect, the binding component 130 can be utilized to associate, link, bind and/or map an EDGE definition (e.g., EDGE definition 304) stored in library 302, with the definition of a data source such as, but not limited to, a User Defined Type (UDT) or an AOI. Moreover, when an instance 306 of the EDGE is created in an HMI configuration environment 604, a designer can be prompted with a selection of suitable data sources (606-610) from a pre-configured program file.

Further, a population component 602 can be utilized to populate the instance of the EDGE with information to access data value fields that are stored and sourced by a data

```
<SimpleGauge name="Gauge_102">
    <dataValue type="LegacyStructWithMeta">{::Controller_1\LegacyStruct_102}</dataValue>
</SimpleGauge>
```

TABLE 1

| Property | Value |
| --- | --- |
| dataValue | {::Controller_1\LegacyStruct_102.value} |
| @Description | {::Controller_1\LegacyStruct_102.descr} |
| @Min | {::Controller_1\LegacyStruct_102.min} |
| @Max | {::Controller_1\LegacyStruct_102.max} |
| @Units | {::Controller_1\LegacyStruct_102.EU} |

```
<SimpleGauge name="Gauge_103">
    <dataValue
        type="TIMER">{::Controller_1\Timer_103}</dataValue>
</SimpleGauge>
```

TABLE 2

| Property | Value |
| --- | --- |
| dataValue | {::Controller_1\Timer_103.ACC} |
| @Description | {::Controller_1\Timer_103.@Description} |
| @Min | 0 |
| @Max | {::Controller_1\Timer_103.PRE} |
| @Units | msec |

It can be appreciated that, although the above example gauge EDGE utilizes a complex property, several simple properties can also be exposed for configuration by the end user. For example, the default bindings of the simple properties can employ meta-data from one of the other properties. Using this approach minimizes the configuration of the gauge EDGE instance when bound to data that supports these meta-data fields.

source (606-610), associated with properties of the EDGE definition. By associating an EDGE definition with data source type information such as UDT or AOI fields, the configuration of an instance 306 of EDGE is simplified, reducing the population of suitable data source fields from "what ever is configured" to "only instances of the associated data source type." This also makes it possible to employ an EDGE as a data source inspector, selecting from among a set of data items of the particular type of data source associated with the EDGE definition. In one aspect, associating EDGE definitions with data source type information makes it easier to build domain-specific automation design content, connecting logic in the program file with Graphic Element content in a Configuration file.

Figure 7:
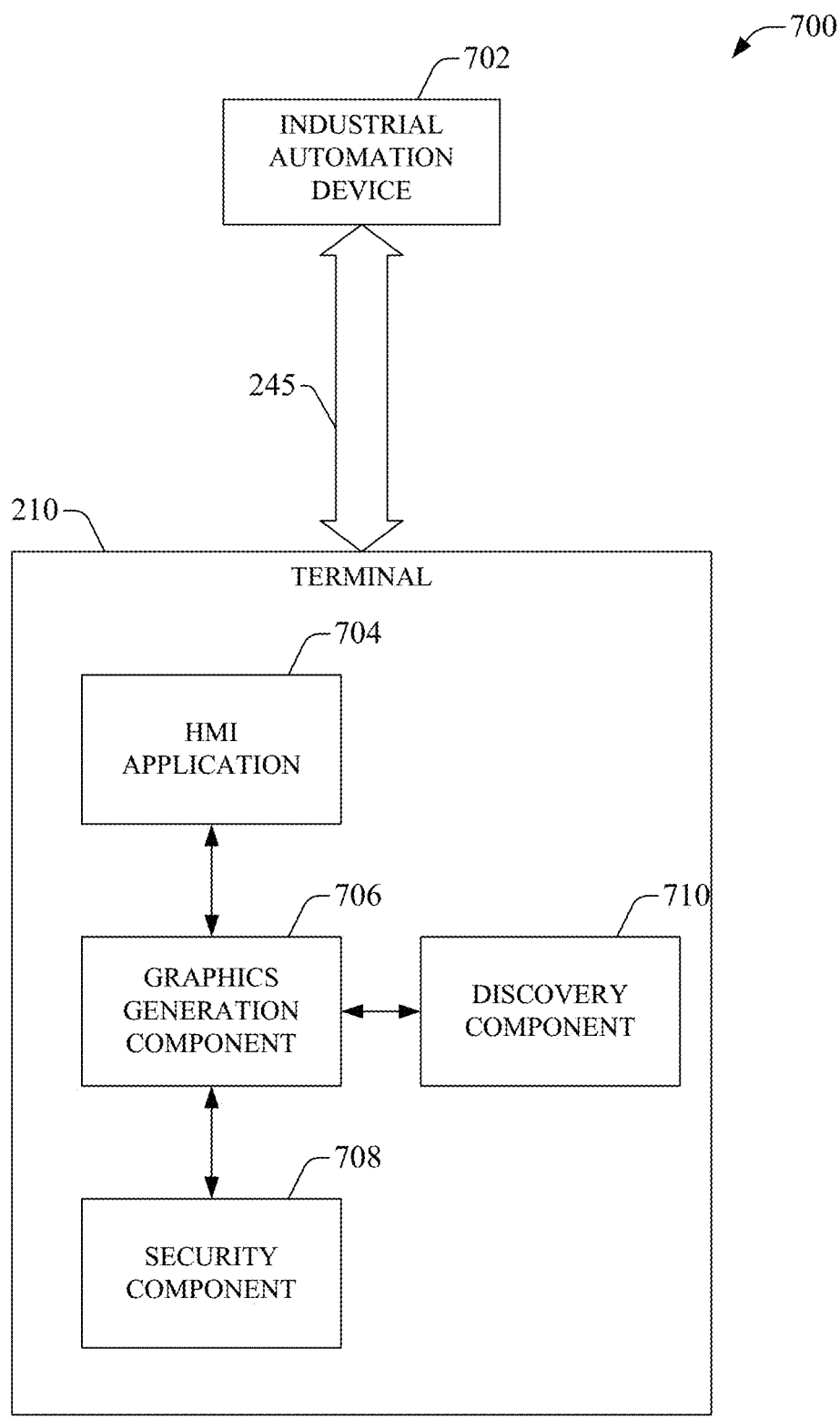
FIG. 7 illustrates an example system for generating graphic elements automatically, through features or aspects described herein.

FIG. 7 illustrates a system for generating graphic elements automatically, in accordance with an aspect of the subject innovation. Typically, terminal 210 can be coupled to an industrial automation device 702 (e.g., controller 250) via a wired and/or wireless access network 245. In one aspect, the terminal 210 can be programmed with an HMI application 704, for displaying content contained in the HMI application 704. Moreover, the system 700 enables a user to select information from the industrial automation device 702 that can be displayed on the terminal 210. As an example, the HMI application 704 can be new, e.g., previously unprogrammed, and system 700 can facilitate generation of a set of screens in the HMI based on the data in the industrial automation device 702.

According to an embodiment, a graphics generation component 706 can be utilized to automatically create an application that represents logic within the industrial automation device 702. In one aspect, the graphics generation component 706 can detect connection of the industrial automation device 702, for example, via the access network 245. Further, the graphics generation component 706 can identify the data from the industrial automation device 702 and determine a graphic element and/or faceplate from the HMI application 704 that is best suited to represent the data. In an automatic mode (e.g., when a user selects an "auto create" option), the terminal 210 can create an application that best represents the logic in the industrial automation device 702, without requesting and/or receiving user input. For example, a discovery component 710 can be utilized for discovery of information (e.g., logic) from the industrial automation device 702. Typically, the graphics generation component 706 can identify logic based on the information provided by the discovery component 710 or by querying the industrial automation device 702, and can identify a graphic element (and/or faceplate) to represent the logic in the HMI application 704. Alternatively, in a manual mode (e.g., when a user selects a "create with prompts" option), the graphics generation component 706 can query and receive user input to manually select the controls and/or screen grouping that best represents the logic in the industrial automation device 702. Typically, the "create with prompts" option allows increased flexibility for the user, but requires more user interaction.

In an aspect, the graphics generation component 706 can build a list of graphic elements that best fit the logic of the industrial automation device 702 and identify a recommended graphic element from the list, for example a best/optimal graphic element. As an example, to infer the list of graphic elements, e.g., to reason and draw a conclusion based on a set of metrics, formal arguments, or known mathematical outcomes in controlled scenarios, graphics generation component 706 can exploit various artificial intelligence (AI) techniques. AI techniques typically apply advanced mathematical algorithms or methods to a data set; such algorithms or methods are part of the methodology and can include decision trees, neural networks, regression analysis, principal component analysis (PCA) for feature and pattern extraction, cluster analysis, genetic algorithm, or reinforced learning. In particular, graphics generation component 706, or one or more components therein, can employ at least one of numerous methods for learning from the data set and then drawing inferences from models formally represented by employed method. As an example, the numerous methods for learning can include Hidden Markov Models (HMMs) and related prototypical dependency models can be employed. General probabilistic graphical models, such as Dempster-Shafer networks and Bayesian networks like those created by structure search using a Bayesian model score or approximation can also be employed. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited by the graphics generation component 706. In one example, the user can provide a final determination on the graphic element to be utilized. In this manner, the user can build an HMI application 704 on the terminal 210 without using a design tool.

Additionally or optionally, a security component 708 can be utilized to restrict access to the industrial automation device 702. Although security component 708 is depicted to reside within terminal 210, it can be appreciated that the security component 708 can reside within the industrial automation device 702, a disparate device (not shown) coupled to the access network 245, distributed over multiple devices, etc. As an example, the security component 708 can verify security credentials (e.g., username, password, etc.) received from the user (or associated with the terminal 210) to grant/restrict access the industrial automation device 702. Typically, most any authentication and/or authorization technique can be utilized, including, but not limited to, biometric identification and/or verification. The security component 708 can also apply restrictions on the content generated by the graphics generation component 706. The HMI application 704 configured in this manner can be saved on the terminal 210 and can be available for upload to a desktop editing environment for further manipulation. According to one aspect, the graphics generation component 706 can also replace the current contents of a configured HMI application 704 in view of the information received from a newly attached controller (not shown). The security component 708 can be utilized to prevent accidental or deliberate access of this feature.

Figure 8:
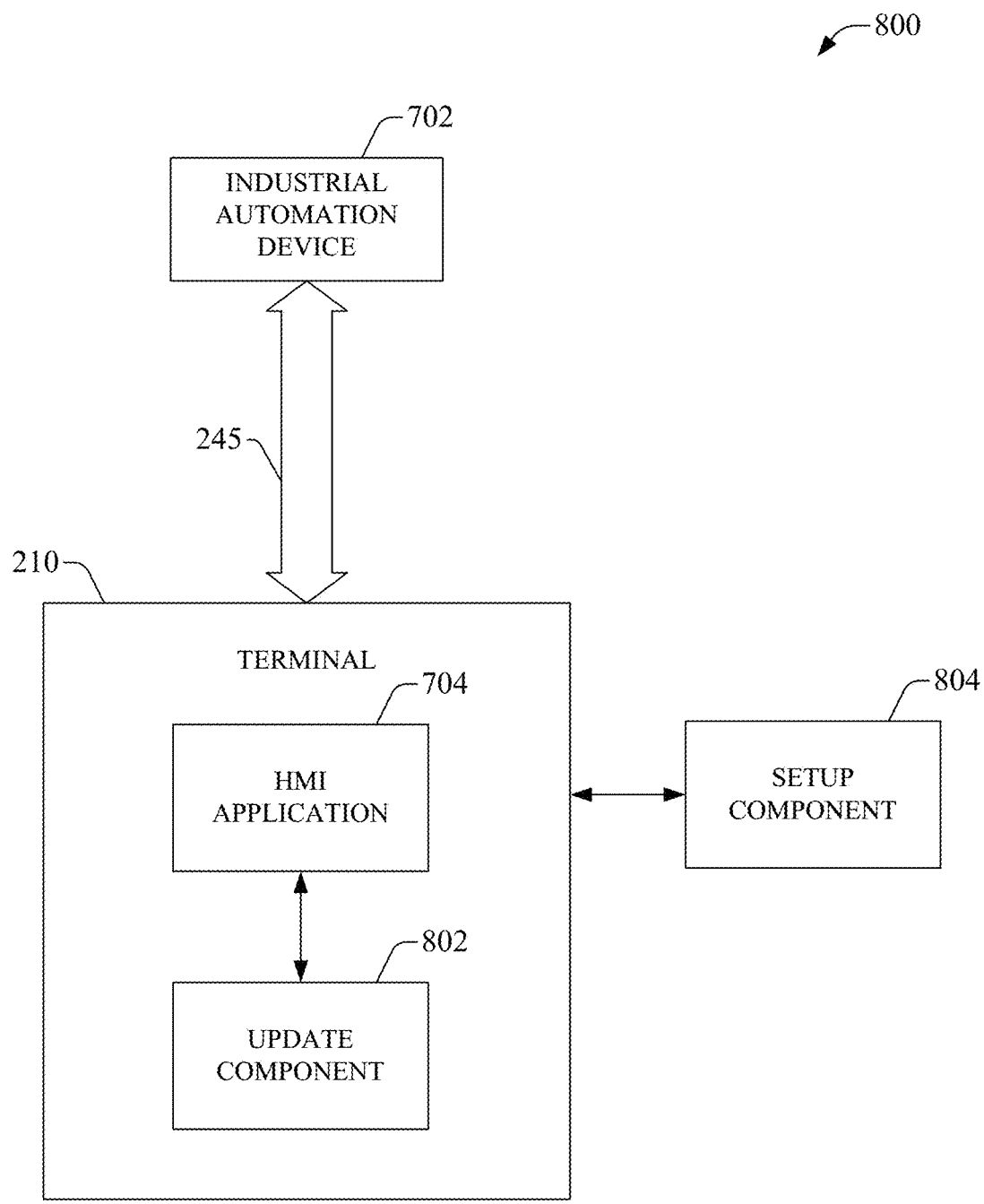
FIG. 8 illustrates an example system that facilitates instance discovery, according to an aspect of the subject innovation.

FIG. 8 illustrates an example system 800 that facilitates instance discovery, according to an aspect of the subject innovation. The system 800 enables a user to change the information in an industrial automation device 702, coupled to terminal 210 that includes an HMI application 704 configured for the industrial automation device 702, and detects the change without requiring a manual refresh. For example, the user can change names, instances of a loop, etc.

According to an aspect, the change can include modifying, adding, and/or deleting components of the industrial automation device 702. For example, the name of a tag in the industrial automation device 702 is changed from "Boiler1" to "MainBoiler". In the example case of the name change, the update component 802 can detect that the tag name was changed and update the HMI application 704 to reflect these changes, without a manual refresh by the user. In another example, if new components are added to the industrial automation device 702, the update component 802 can determine what has changed, and then find an optimal location in the HMI application 704 where the new graphic element corresponding to the new component can be added/displayed. Typically, the addition of the new graphic element can be impacted by several factors, such as, but not limited to, an update mode that the terminal 210 is configured for, security of a user logged in at the terminal 210, configuration information supplied by a designer of the HMI 704, and the like. As an example, the update modes can include an automatic and/or a manual update. Moreover, if the update mode is set as automatic, the update component 802 can identify a new graphic element(s) that can be added and a location for adding the new graphic element(s), without (or with minimal) user intervention. Typically, an AI technique and/or most any optimization mechanism can be utilized to identify the new graphic element(s) and a location that is best suited for representing the change. Moreover, new logic identified on the industrial automation device 702 can be employed by the update component 802 to identify a type of graphic element that best matches/represents the logic content. This matching/representing can utilize pre-defined graphic element types that are available in the terminal 210. In one example, the terminal 210 (e.g., via display component 218) can provide an indication of which new graphic element was added as result of this discovery and/or the indication can be displayed until it is acknowledged. Alternatively, if the update mode is set as manual, then the update component 802 can notify the user that a new component has been detected on the industrial automation device 702 and can prompt the user to select a new graphic element to associate with the new component and/or a location for the new graphic.

In one aspect, if a component is deleted from the industrial automation device 702, the update component 802 can detect the delete and mark the associated component for delete from the HMI application 704. Typically, the update component 802 can prompt a user to confirm delete of a graphic element associated with the deleted component (e.g., in automatic and/or manual modes). Oftentimes, multiple changes can be detected by the update component 802, for example, new item added, existing item deleted, and existing item renamed etc. In this example case, the update component 802 can automatically update the HMI application 704, but prompt the user for input incase of any conflicts and/or ambiguous situations. For example, if HMI application 704 includes a reference to a tag called "Boiler1," which is deleted from the industrial automation device 702, and two new tags, "MainBoiler" and "Boiler1,"are created on the industrial automation device 702. In this example situation the update component 802 can detect that a new tag is created for "MainBoiler" and add an appropriate graphic element to the HMI application 704. In addition, the update component 802 can query a user to determine whether the reference to the named tag "Boiler1" is to be changed to match the new "Boiler1" tag in the industrial automation device 702, or whether a new graphic element is to be created. In one aspect, when graphic elements are modified, added and/or removed, the update component 802 can adjust (e.g., auto-scale) the content on a screen of the terminal to accommodate the changes.

According to an embodiment, the update component 802 can monitor equipment (e.g., industrial automation device 702) coupled to the terminal 210 continuously, periodically, and/or on-demand. In another embodiment the equipment can push data indicative of the change to the terminal 210. Additionally or alternatively, if the equipment is disconnected or is not coupled to the terminal 210, the monitoring by the update component 802 can be suspended and can be resumed as soon as the connection is re-established. Further, in one aspect, the update component 802 can provide a visual notification on graphic element(s) that have been added, deleted or changed. Typically, this notification can stay on a screen until a user has acknowledged the addition or change. In the case of a deletion, a user with verified security credentials (e.g., by security component 708) can be prompted to approve the delete. Further, the update component 802 can provide, other users, a notification indicating that the delete has occurred, but acknowledgement is pending. It can be appreciated that security credentials can be obtained and verified (e.g., by security component 708) for any change, for example, add, modify and/or delete, detected by the update component 802, prior to applying the change.

User security data (e.g., received from security component 708) can have an impact on operation of the update component 802. For example, during an automatic mode, all changes except delete can be performed without user intervention. In the case of a delete, the update component 802 requests a confirmation from a user authorized to approve the deletion. Moreover, other users (e.g., that are not authorized to approve the deletion) that log in to HMI terminal 210 can be provided with an indication of the changes that have been made. In contrast, during the manual mode, all changes must be approved by a user with appropriate security access rights. Typically, all other users can be notified that a change is pending approval, so that a user with correct security credentials can be notified and logged in to accept the changes. Moreover, when the authorized user logs in, the update component 802 can prompt the authorized user to confirm the changes, select new graphic elements and/or provide a location for the new graphic elements.

Typically, a setup component 804 can be utilized to configure the HMI application 704 in the design time environment to identify a level of instance discovery. As an example, the setup component 804 can be included within a design time client tool. Moreover, a designer can utilize the setup component 804 to control a scope of an instance discovery feature, for example, disable instance discovery for the application 704, enable or disable at a screen level based on the scope in the industrial automation device 702, and/or configure a screen to adapt based on a tag type. Limiting instance discovery based on scope in the industrial automation device 702 allows for a single industrial automation device 702 to have many nodes. For example, a single controller can control two assembly lines. A first screen of the application 704 can be associated with tags of the first assembly line and a second screen of the application 704 can be associated with the second assembly line. In this manner, if new logic components are added to the second line, only the second screen will be updated (e.g., by update component 802. In addition, the setup component 804 can specify whether the application 704 can pre-identify a best/optimal/preferred choice when a type of logic component is encountered on the industrial automation device 702. Further, the setup component 804 can also provide an update frequency or time that the update component 802 can query the industrial automation device 702 for changes.

Figure 9:
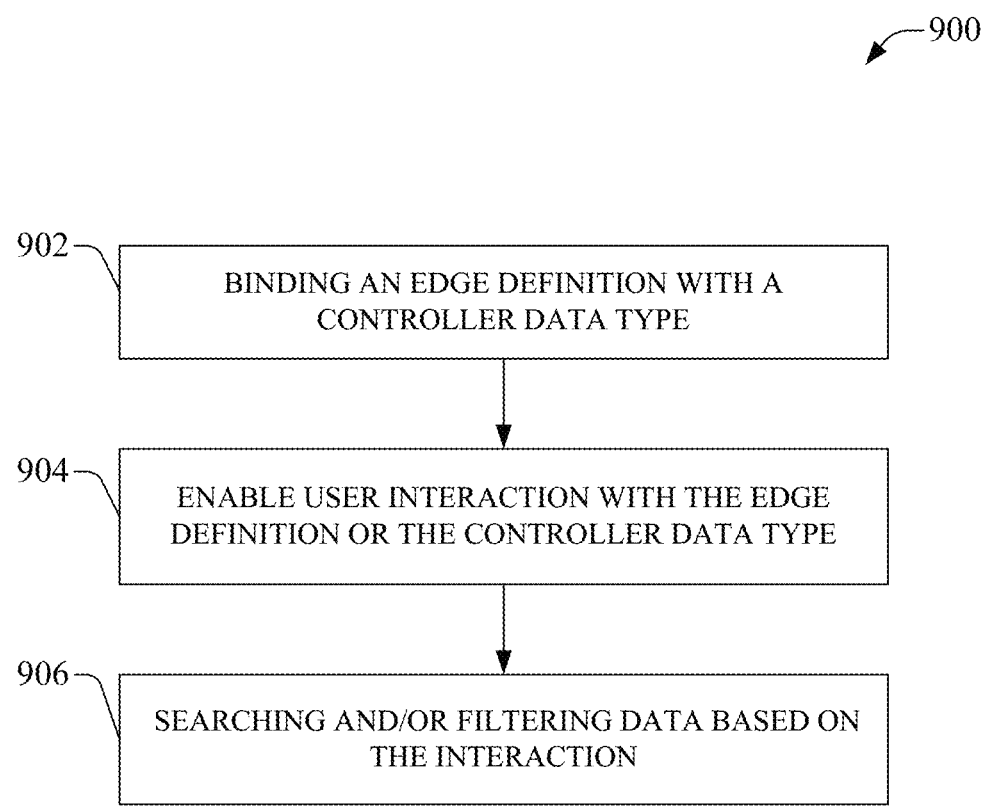
FIG. 9 illustrates an example methodology for bi-directional binding of graphic elements to industrial automation data.
Figure 10:
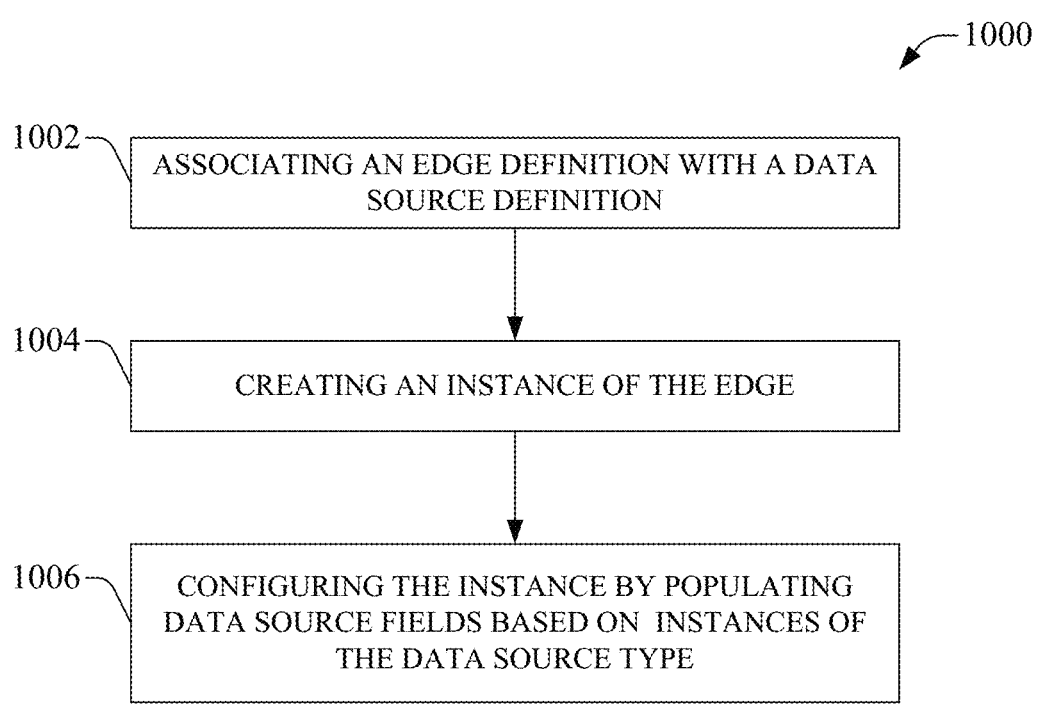
FIG. 10 illustrates an example methodology for associating an EDGE with a data source of an industrial automation environment.
Figure 11:
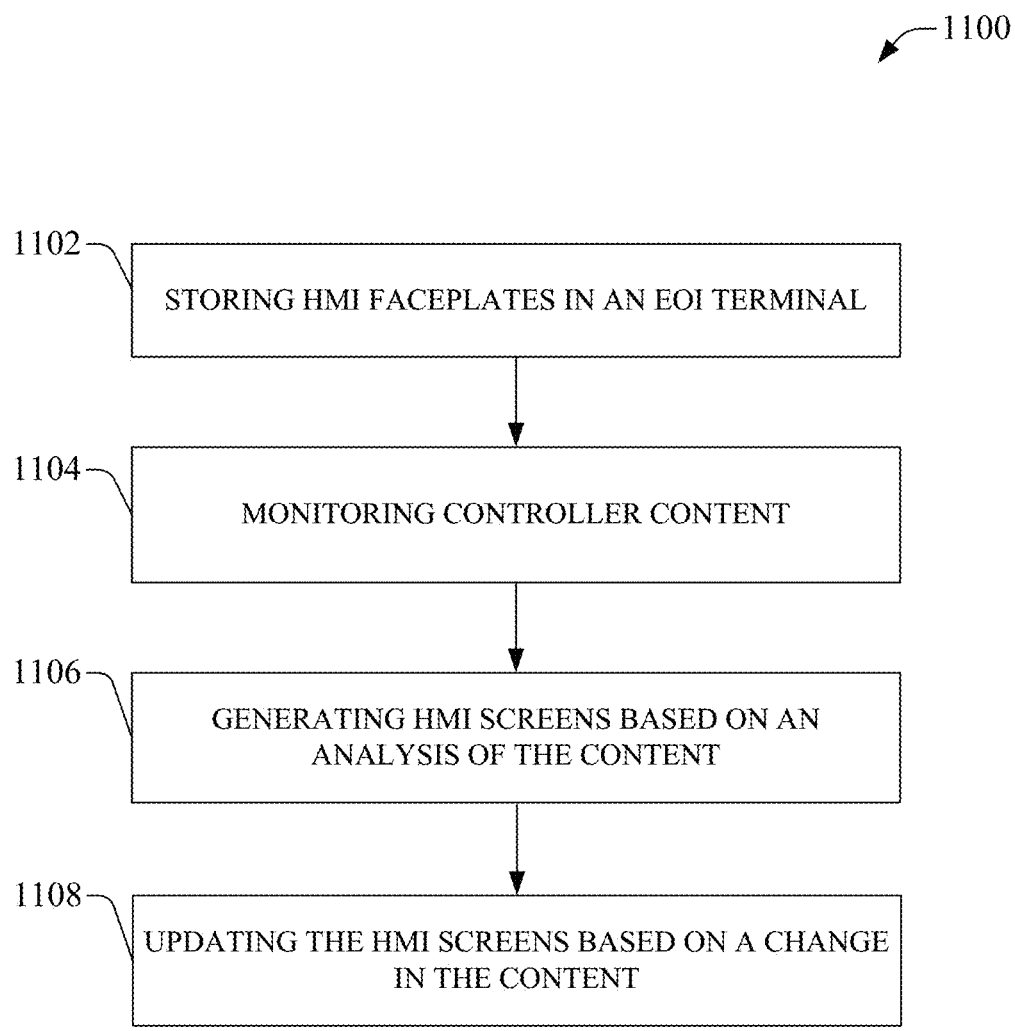
FIG. 11 illustrates an example methodology for automatically generating graphic elements according to aspects of the subject disclosure.

In view of the example systems described above, example methods that can be implemented in accordance with the disclosed subject matter can be better appreciated with reference to flowcharts in FIGS. 9-11. For purposes of simplicity of explanation, various methods disclosed herein are presented and described as a series of acts; however, it is to be understood and appreciated that the subject disclosure is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

FIG. 9 illustrates an example methodology 900 for bi-directionally binding graphic elements to industrial automation data, according to aspects of the subject disclosure. At 902, an EDGE definition is bound to a controller data type. Although a controller data type is described herein, it can be appreciated that the EDGE definition can be bound to most any industrial automation data type. Moreover, type mappings can be utilized to bind a property within the EDGE definition to the controller data. In one example, a strongly-typed property can be provided for complex data structures or scalars, a loosely-typed property can be provided for scalar types (e.g., anyNum) and/or an un-typed property can be provided for deferred connectivity and/or parameter substitution.

At 904, user interaction with the EDGE definition or the controller data type can be enabled. Further, at 906, data searching and/or filtering can be performed based on the user interaction. Moreover, methodology 900 provides bi-directional bindings between graphic element definitions and controller data types, such that, various user scenarios relating to drag/drop, search/filter, and other interactions which improve productivity can be enabled and an integrated design-time and run-time experience can be provided. The example method 900 can be implemented (e.g., executed) by a terminal (e.g., 210) that renders controller data. In an aspect, one or more processors configured to provide or that provide the functionality of the one or more terminals can implement the subject example method.

FIG. 10 illustrates an example methodology 1000 for associating an EDGE with a data source of an industrial automation environment in accordance with aspects of the subject disclosure. At 1002, an EDGE definition can be associated with a data source definition, for example, a UDT or AOI. Further, at 1004, an instance of the EDGE is created, for example in an HMI configuration environment. Moreover, at 1006, the instance is configured by populating data source fields based on instances of the data source type. In one aspect, a user can be prompted with a selection of suitable data sources from a previously configured program file. In one example, one or more data value fields, stored and sourced by the data source, can be associated with properties of the EDGE definition, such that when the EDGE definition is used to create an HMI graphic element instance, that instance can be populated with information to access the data source fields. Typically, associating EDGE definitions with data source type information can provide easy to build domain-specific automation design content, connecting logic in a program file with graphic element content in a configuration file.

Referring to FIG. 11, there illustrated is an example methodology 1100 for automatically generating graphic elements according to aspects of the subject disclosure. In an embodiment, the terminal (e.g., 210) can perform the subject example methodology 1100. At 1102, HMI faceplates can be stored within an EOI terminal. Typically, the EOI terminal can be coupled to an industrial automation device, for example, a controller. At 1102, the controller content can be monitored, for example, periodically, at a pre-defined time and/or on-demand. At 1106, HMI screens can be generated based on an analysis of the content, for example, automatically, or manually. During automatic generation, an application can be created that optimally represents the logic in the controller. Further, the logic of the controller can be queried and a faceplate and/or graphic element can be identified based on the logic. Alternately during a manual mode, user input can be received to select the controls and/or screen groupings that represent the logic in the controller. Furthermore, at 1108, the HMI screens, including graphic elements and/or faceplates, can be updated based on a change in the content. For example, addition, modification and/or deletion of a component can be detected and the HMI screen can modified accordingly.

Method(s) disclosed throughout the subject specification and annexed drawings are capable of being stored on an article of manufacture to facilitate transporting and transferring such method(s) to computers or chipsets with processing capability(ies) for execution, and thus implementation, by a processor, or for storage in a memory. In an aspect, one or more processors that enact method(s) described herein can be employed to execute computer-executable code instructions retained in a memory, or any computer-readable or machine-readable medium, to implement method(s) described herein; the code instructions, when executed by the one or more processor implement or carry out the various acts in the method(s) described herein. The computer-executable code instructions provide a computer-executable or machine-executable framework to enact, or implement, the method(s) described herein.

Figure 12:
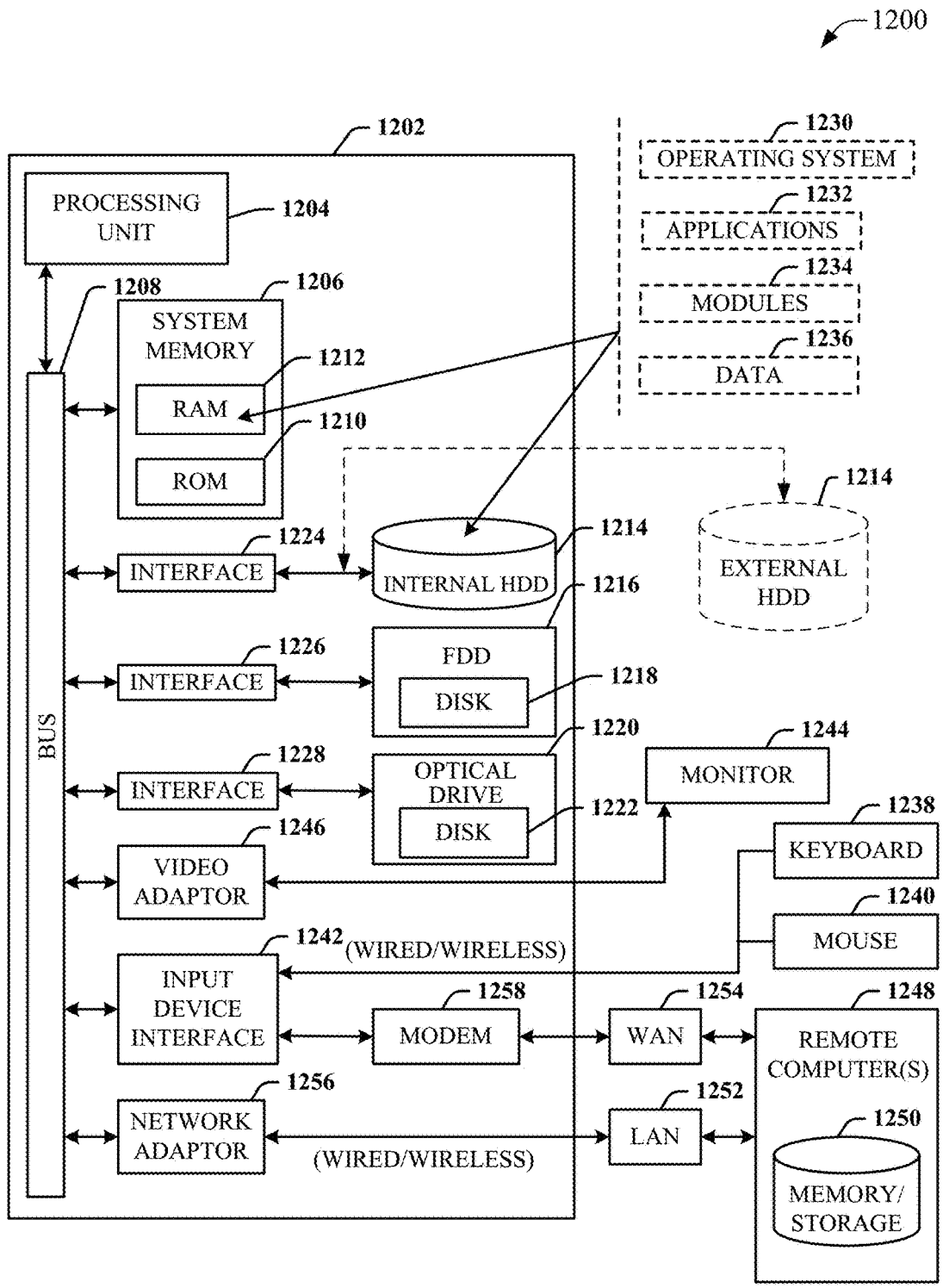
FIG. 12 illustrates a block diagram of a computer operable to execute the disclosed architecture.

In order to provide additional context for various aspects thereof, FIG. 12 and the following discussion are intended to provide a brief, general description of a suitable computing environment 1200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Interface 1224 enables functional coupling of computer 1202 to a removable memory, such as a USB memory device or a SD memory card. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are illustrative and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
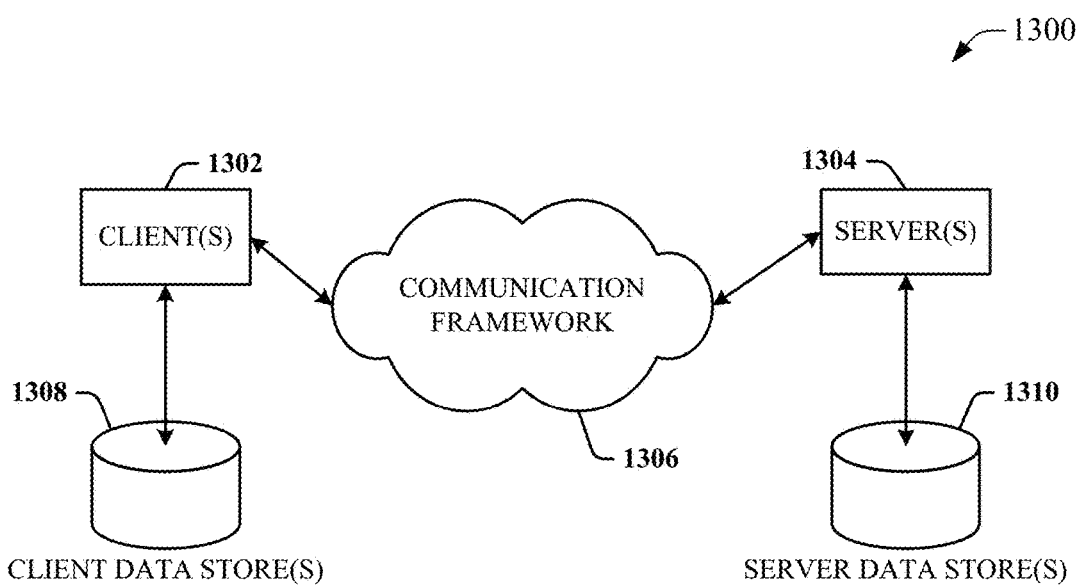
FIG. 13 illustrates a schematic block diagram of an example computing environment.

Referring now to FIG. 13, there is illustrated a schematic block diagram of an example computing environment 1300 in accordance with another aspect. The system 1300 includes one or more client(s) 1302. The client(s) 1302 can be hardware and/or software (e.g., threads, processes, computing devices). The client(s) 1302 can house cookie(s) and/or associated contextual information by employing the subject innovation, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s)b 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) or associated contextual information). Similarly, the server(s) 1304 are operatively connected to one or more server data store(s) 1310 that can be employed to store information local to the servers 1304.

In the subject specification and annexed drawings, terms such as "repository," "store," "data store," data storage," and substantially any term(s) that convey other information storage component(s) relevant to operation and functionality of a functional element or component described herein, refer to "memory components," or entities embodied in a "memory" or components comprising the memory. The memory components described herein can be either volatile memory or nonvolatile memory, or can include both volatile and nonvolatile memory. In addition, the memory components described herein can be statically affixed (screwed, bolted, soldered, etc.) or removably affixed. Further, the memory components can include computer-readable or machine-readable storage media.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device (e.g., a PAC), discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps or acts of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a memory that stores computer executable instructions; and
    a processor, communicatively coupled to the memory, that executes the instructions to perform acts, comprising:
        determining, based on metadata associated with a definition of a graphic element that is to be displayed via a human machine interface of an industrial automation system, that a property of the definition has been assigned as an optional property; and
        based on input data, facilitating a binding of the property to a controller tag associated with an industrial controller of the industrial automation system.

2. The system of claim 1, wherein the graphic element comprises an externally generated graphic element received from an original equipment manufacturer.

3. The system of claim 1, wherein the graphic element comprises a user defined graphic element.

4. The system of claim 1, wherein the operations further comprise:
    facilitating a display of an instance of the graphic element based on information from the controller tag.

5. The system of claim 1, wherein a first data type associated with the property is determined to be mapped to a second data type.

6. The system of claim 5, wherein the operations further comprise:
    in response to receiving selection data that represents a selection of the definition, facilitating a display of a set of controller tags that support the second data type.

7. The system of claim 5, wherein the operations further comprise:
    mapping the first data type with the second data type in response to determining that the property is a strongly-typed property, wherein the strongly-typed property specifies that the first data type is to match a third data type of a bound tag.

8. The system of claim 5, wherein the property is a first property and the operations further comprise:
    in response to determining a second property of the definition of the graphic element is a loosely-typed property, verifying a validity of a third data type of a bound tag.

9. The system of claim 1, wherein the operations further comprise:
    based on the input data, configuring a set of respective bindings for a set of internal items of the graphic element.

10. The system of claim 1, wherein the operations further comprise:
    in response to the determining, receiving configuration data that is employable to configure the binding of the property.

11. A method, comprising:
    determining, by a system comprising a processor, mapping data that specifies mapping of a first data type, associated with a property of a definition of a graphic element, with a second data type, wherein the property has been determined to be assigned as an optional property based on metadata associated with the definition; and
    in response to receiving selection data that selects the definition of the graphic element, initiating a display of a set of controller tags that support the second data type.

12. The method of claim 11, wherein the graphic element comprises an externally generated graphic element received from an original equipment manufacturer.

13. The method of claim 11, wherein the graphic element comprises a user defined graphic element.

14. The method of claim 11, wherein the set of controller tags is a first set of first controller tags and the initiating comprises initiating the display of a second set of second controller tags that support the first data type.

15. The method of claim 11, wherein the operations further comprise:
    based on the determining, updating a visualization of the definition of the graphic element to specify that the definition of the graphic element supports the second data type.

16. The method of claim 11, wherein the operations further comprise:

in response to a determining that the property has been assigned as the optional property, initiating a design-time validation to facilitate a determination of a binding problem.

17. A non-transitory computer readable storage medium comprising computer-executable instructions that, in response to execution, cause an industrial automation device comprising a processor to perform operations, comprising:

determining mapping data that specifies mapping of a first data type, associated with a property of a definition of a graphic element, with a second data type, wherein the property has been determined to be assigned as an optional property based on metadata associated with the definition; and in response to receiving selection data that selects the definition of the graphic element, initiating a display of a set of controller tags that support the second data type.

18. The non-transitory computer readable storage medium of claim 17, wherein the operations further comprise:

based on the determining, updating a visualization of the definition of the graphic element to specify that the definition of the graphic element supports the second data type.

19. The non-transitory computer readable storage medium of claim 17, wherein the operations further comprise:

in response to a determining that the property has been assigned as the optional property, initiating a design-time validation to facilitate a determination of a binding problem.

20. The non-transitory computer readable storage medium of claim 17, wherein the operations further comprise:

in response to receiving input data that binds the definition of the graphic element to a controller tag of the set of controller tags, configuring an instance of the graphic element based at least in part on data from the controller tag.

* * * * *